(12) United States Patent
Darcy

(10) Patent No.: US 7,325,097 B1
(45) Date of Patent: Jan. 29, 2008

(54) METHOD AND APPARATUS FOR DISTRIBUTING A LOGICAL VOLUME OF STORAGE FOR SHARED ACCESS BY MULTIPLE HOST COMPUTERS

(75) Inventor: Jeffrey J. Darcy, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 619 days.

(21) Appl. No.: 10/676,831

(22) Filed: Oct. 1, 2003

Related U.S. Application Data

(63) Continuation-in-part of application No. 10/606,448, filed on Jun. 26, 2003, now abandoned.

(51) Int. Cl.
G06F 12/06 (2006.01)

(52) U.S. Cl. .......................... 711/117; 711/147; 711/170; 709/216; 709/215; 709/208

(58) Field of Classification Search ................. 711/117, 711/147, 170, 173, 203, 148; 709/203, 216, 709/217, 215, 208
See application file for complete search history.

(56) References Cited

U.S. PATENT DOCUMENTS

| | | | | |
|---|---|---|---|---|
| 5,664,170 A | * | 9/1997 | Taylor | 709/220 |
| 5,924,115 A | * | 7/1999 | Von Herzen et al. | 711/117 |
| 6,516,425 B1 | * | 2/2003 | Belhadj et al. | 714/6 |
| 6,854,035 B2 | * | 2/2005 | Dunham et al. | 711/117 |
| 6,957,294 B1 | * | 10/2005 | Saunders et al. | 711/4 |
| 6,990,547 B2 | * | 1/2006 | Ulrich et al. | 709/202 |
| 7,024,427 B2 | * | 4/2006 | Bobbitt et al. | 707/200 |

* cited by examiner

*Primary Examiner*—Pierre-Michel Bataille
(74) *Attorney, Agent, or Firm*—Wolf, Greenfield & Sacks, P.C.

(57) ABSTRACT

A method and apparatus for use in a computer system including a plurality of host computers including a root host computer and at least one child host computer. The root host computer exports at least a portion of the volume of storage to the at least one child host computer so they can share access to the volume of storage. In one embodiment, the volume of storage is stored on at least one non-volatile storage device. In another aspect, the volume of storage is made available to the root from a storage system. In a further aspect, at least a second portion of the volume of storage is exported from a child host computer to at least one grandchild host computer.

169 Claims, 11 Drawing Sheets

|  | Set 1 | Set 2 |
|---|---|---|
| 906a | 908a | 910a |
| 906b | 908b | 910b |
| 906c | 908c | 910c |
| 906d | 908d | 910d |
| 906e | 908e | 910e |
| 906f | 908f | 910f |
| 906g | 908g | 910g |
| 906h | 908h | 910h |

Figure 10

METHOD AND APPARATUS FOR DISTRIBUTING A LOGICAL VOLUME OF STORAGE FOR SHARED ACCESS BY MULTIPLE HOST COMPUTERS

This application is a continuation-in-part of U.S. application Ser. No. 10/606,448 entitled "Method And Apparatus For Distributing A Logical Volume Of Storage For Shared Access By Multiple Host Computers" and filed on Jun. 26, 2003 now abandoned.

FIELD OF THE INVENTION

The present invention relates to computer systems wherein multiple host computers share access to one or more volumes of storage.

DESCRIPTION OF THE RELATED ART

Many computer systems include one or more host computers and one or more storage systems that store data used by the host computers. An example of such a system is shown in FIG. 1, and includes a host computer 1 and a storage system 3. The storage system typically includes a plurality of storage devices on which data are stored. In the exemplary system shown in FIG. 1, the storage system 3 includes a plurality of disk drives 5a-5b, and a plurality of disk controllers 7a-7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data are stored in the cache), rather than from one of the disk drives 5a-5b, to execute the read more efficiently. Similarly, when the host computer 1 executes a write to the storage system 3, the corresponding storage bus director 9 may execute the write to the cache 11. Thereafter, the write can be destaged asynchronously, in a manner transparent to the host computer 1, to the appropriate one of the disk drives 5a-5b. Finally, the storage system 3 includes an internal bus 13 over which the storage bus directors 9, disk controllers 7a-7b, and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each being a SCSI driver. Alternatively, communication between the host computer 1 and the storage system 3 can be performed over a Fibre Channel fabric.

As shown in the exemplary system of FIG. 1, some computer systems employ multiple paths for communicating between the host computer 1 and the storage system 3 (e.g., each path includes a host bus adapter 15, a bus 17 and a storage bus director 9 in FIG. 1). In many such systems, each of the host bus adapters 15 has the ability to access each of the disk drives 5a-b, through the appropriate storage bus director 9 and disk controller 7a-b. It should be appreciated that providing such multi-path capabilities enhances system performance, in that multiple communication operations between the host computer 1 and the storage system 3 can be performed simultaneously.

FIG. 2 is a schematic representation of a number of mapping layers that may exist in a known computer system such as the one shown in FIG. 1. The mapping layers include an application layer 21 which includes application programs executing on the processor 16 of the host computer 1. As used herein, "application program" is not limited to any particular implementation, and includes any kind of program or process executable by one or more computer processors, whether implemented in hardware, software, firmware, or combinations of them. The application layer 21 will generally refer to storage locations used thereby with a label or identifier such as a file name, and will have no knowledge about where the corresponding file is physically stored on the storage system 3 (FIG. 1).

Below the application layer 21 is a file system and/or a logical volume manager (LVM) 23 that maps the label or identifier specified by the application layer 21 to a logical volume presented by the storage system 3 to the host computer 1, and that the host computer perceives to correspond directly to a physical storage device (e.g., of one of the disk drives 5a-b) within the storage system 3. Below the file system/LVM layer 23 is a multi-path mapping layer 25 that maps the logical volume address specified by the file system/LVM layer 23, through a particular one of the multiple system paths, to the address for the logical volume presented by the storage system 3. Thus, the multi-path mapping layer 25 not only specifies a particular logical volume address, but also specifies a particular one of the multiple system paths used to access the specified logical volume.

If the storage system 3 were not an intelligent storage system, each logical volume presented to the host computer would correspond to a particular physical storage device (e.g., one of disk drives 5a-b) within the storage system 3. However, for an intelligent storage system such as that shown in FIG. 1, the storage system itself may include a further mapping layer 27, such that each logical volume presented to the host computer 1 may not correspond directly to an actual physical device (e.g., a disk drive 5a-b) on the storage system 3. Rather, a logical volume can be spread across multiple physical storage devices (e.g., disk drives 5a-b), or multiple logical volumes presented to the host computer 1 can be stored on a single physical storage device.

In the computer system of FIG. 1, the host computer 1 does not share data stored in storage system 3 with any other host. However, with the rapid growth of computer networks, it has become increasingly desirable to share stored data between two or more hosts.

FIG. 3 illustrates a conventional computer system in which access to one or more logical volumes within a storage system 305 is shared among multiple host computers 301-303. The shared access is conventionally achieved by connecting the host computers 301-303 to the storage system 305 via a network 307. Via the network, the multiple host computers 303 share access to one or more logical volumes of storage made available via the storage system 305.

The two types of networking technology used to conventionally implement the network 307 include Fibre Channel and Internet Small Component Interface (iSCSI). Fibre Channel is a networking technology often used to connect storage systems and other devices in a storage area network (SAN), and typically allows relatively high performance data transfer. However, Fibre Channel networks typically require relatively expensive networking hardware, such as Fibre Channel host bus adapters, rootrs, hubs, switches, and interconnecting cabling.

iSCSI also has been employed for implementing storage networking, and carries SCSI commands over Internet Protocol (IP) networks. Thus, iSCSI can be employed to transmit information over a wide array of networks, including IP local area networks (LANs) and IP wide area networks (WANs). In an iSCSI network, communications between the host computers 301-303 and the storage system 305 are done through the issuance of appropriate SCSI commands that are encapsulated in IP packets for transmission through the network. At the receiving end, the SCSI commands are extracted from the IP packets and sent to the receiving device.

SUMMARY OF THE INVENTION

One embodiment of the invention is directed to a method for use in a computer system including a plurality of host computers including a root host computer and at least one child host computer, the root host computer having a volume of storage available to it that is stored on at least one non-volatile storage device. The method comprises an act of exporting at least a portion of the volume of storage from the root host computer to the at least one child host computer so that the at least one child host computer and the root host computer share access to the volume of storage. Another embodiment is directed to a computer readable medium encoded with a program that, when executed on the computer system, performs this method.

A further aspect of the invention is directed to a method for use in a computer system including a plurality of host computers and at least one storage system, the plurality of host computers including a root host computer and at least one child host computer, the at least one storage system making a volume of storage available to the root host computer, the at least one storage system having at least storage device on which the volume of storage is stored. The method comprises an act of exporting at least a portion of the volume of storage from the root host computer to the at least one child host computer so that the at least one child host computer and the root host computer share access to the volume of storage. Another embodiment is directed to a computer readable medium encoded with a program that, when executed on the computer system, performs this method.

Another embodiment is directed to a method for use in a computer system including a plurality of host computers including a root host computer, at least one child host computer and at least one grandchild host computer, the root host computer having at least one volume of storage available to it. The method comprises acts of: (A) exporting at least a first portion of the volume of storage from the root host computer to the at least one child host computer; and (B) exporting at least a second portion of the volume of storage from the child host computer to the at least one grandchild host computer, so that the at least one child host computer, the at least one grandchild host computer and the root host computer share access to the volume of storage. Another embodiment is directed to a computer readable medium encoded with a program that, when executed on the computer system, performs this method.

A further embodiment is directed to a method for use in a computer system including a plurality of host computers including at least first and second root host computers, a first group of child host computers and a second group of child host computers, the first and second groups of child host computers each comprising at least one child host computer, the first and second root host computers each having a shared volume of storage available to it. The method comprises acts of: (A) exporting at least a first portion of the shared volume of storage from the first root host computer to the first group of child host computers; and (B) exporting at least a second portion of the shared volume of storage from the second root host computer to the second group of child host computers, so that the first and second root host computers and the first and second groups of child host computers all share access to the shared volume of storage.

A further embodiment is directed to a first host computer for use in a computer system including a plurality of host computers including the first host computer and at least one second host computer, the first host computer having a volume of storage available to it that is stored on at least one non-volatile storage device. The first host computer comprises at least one port that enables the first host computer to be coupled to other components in the computer system; and at least one controller, coupled to the at least one port, to export at least a portion of the volume of storage from the first host computer to the at least one second host computer so that the at least one second host computer and the first host computer can share access to the volume of storage.

Yet another embodiment is directed to a first host computer for use in a computer system including a plurality of host computers and at least one storage system, the plurality of host computers including the first host computer and at least one second host computer, the at least one storage system making a volume of storage available to the first host computer, the at least one storage system having at least storage device on which the volume of storage is stored. The first host computer comprises at least one port that enables the first host computer to be coupled to other components in the computer system; and at least one controller, coupled to the at least one port, to export at least a portion of the volume of storage from the first host computer to the at least one second host computer so that the at least one second host computer and the first host computer can share access to the volume of storage.

A further embodiment is directed to a first host computer for use in a computer system including a plurality of host computers including the first host computer, at least one second host computer, and a third host computer, the third host computer having a volume of storage available to it. The first host computer comprising at least one port that enables the first host computer to be coupled to other components in the computer system; and at least one controller, coupled to the at least one port, to receive at least a first portion of the volume of storage from the third host computer which exports the at least a first portion of the volume of storage to the first host computer so that the third host computer and the first host computer can share access to the volume of storage, the at least one controller further adapted to export at least a second portion of the volume of storage from the first host computer to the at least one second host computer so that the at least one second host computer, the third host computer and the first host computer can share access to the volume of storage.

A further embodiment is directed to a method for creating a cache hierarchy in a computer system, the method comprising an act of creating a software cache hierarchy having at least two software caches that are interrelated to form the cache hierarchy, the at least two software caches including at least a first software cache and a second software cache, wherein the first and second software caches employ different hashing techniques for mapping an address into the first and second software caches. Another embodiment is directed to a computer readable medium encoded with a program that, when executed, performs the method.

Yet another embodiment is directed to a computer for use in a computer system. The computer comprises a processor programmed to implement a software cache hierarchy having at least two software caches that are interrelated to form the cache hierarchy, the at least two software caches including at least a first software cache and a second software cache, wherein the first and second software caches employ different hashing techniques for mapping an address into the first and second software caches.

A further embodiment is directed to a method for determining whether an address hits in a cache hierarchy in a computer system, the cache hierarchy including at least two software caches that are interrelated to form the cache hierarchy, the at least two software caches including at least a first software cache and a second software cache. The method comprising acts of: applying a first hashing algorithm to the address to map the address into the first software cache; determining whether the address hits or misses in the first software cache; and when it is determined that the address misses in the first software cache, performing the acts of applying a second hashing algorithm to the address to map the address into the second software cache, the second hashing algorithm being different from the first hashing algorithm; and determining whether the address hits in the second software cache.

Another embodiment is directed to a method for managing a cache arrangement in a computer system, the cache arrangement having a plurality of caches that are interrelated to form the cache arrangement. The method comprises an act of dynamically reconfiguring the cache arrangement without reconfiguring an application, executing on the computer system, that accesses the cache arrangement. Another embodiment is directed to a computer readable medium encoded with a program that, when executed, performs the method.

A further embodiment is directed to a computer for use in a computer system, the computer comprising a cache arrangement comprising a plurality of caches that are interrelated to form the cache arrangement; and at least one controller capable of dynamically reconfiguring the cache arrangement without reconfiguring an application, executing on the computer system, that accesses the cache arrangement.

Another embodiment is directed to a computer readable medium encoded with a program for execution on a computer system having a cache arrangement, the cache arrangement having a plurality of caches that are interrelated to form the cache arrangement. The program, when executed, performs a method for managing the cache arrangement, the method comprising an act of dynamically reconfiguring the cache arrangement without reconfiguring an application, executing on the computer system, that accesses the cache arrangement.

BRIEF DESCRIPTION OF THE DRAWINGS

FIG. 10 is a diagram of a cache in accordance with an illustrative embodiment of the invention.

DETAILED DESCRIPTION

In addition to the expense associated with conventional computer systems that enable shared access among multiple host computers to one or more logical volumes, applicants have also appreciated that such systems can have negative performance implications in certain circumstances. For example, in a networked system wherein a particular host computer is located in a location that is geographically remote from the storage system (e.g., the host computer 303 in FIG. 3 may be located in San Francisco while the storage system 305 is located in Boston), there may be latency through the network that can negatively impact the performance of the host computer. In addition, in a computer system configuration such as that shown in FIG. 3, each of the host computers 301-303 accesses its volumes of storage directly from the storage system 305, which can place a high load on the storage system 305 that can negatively impact its performance.

Figure 1:
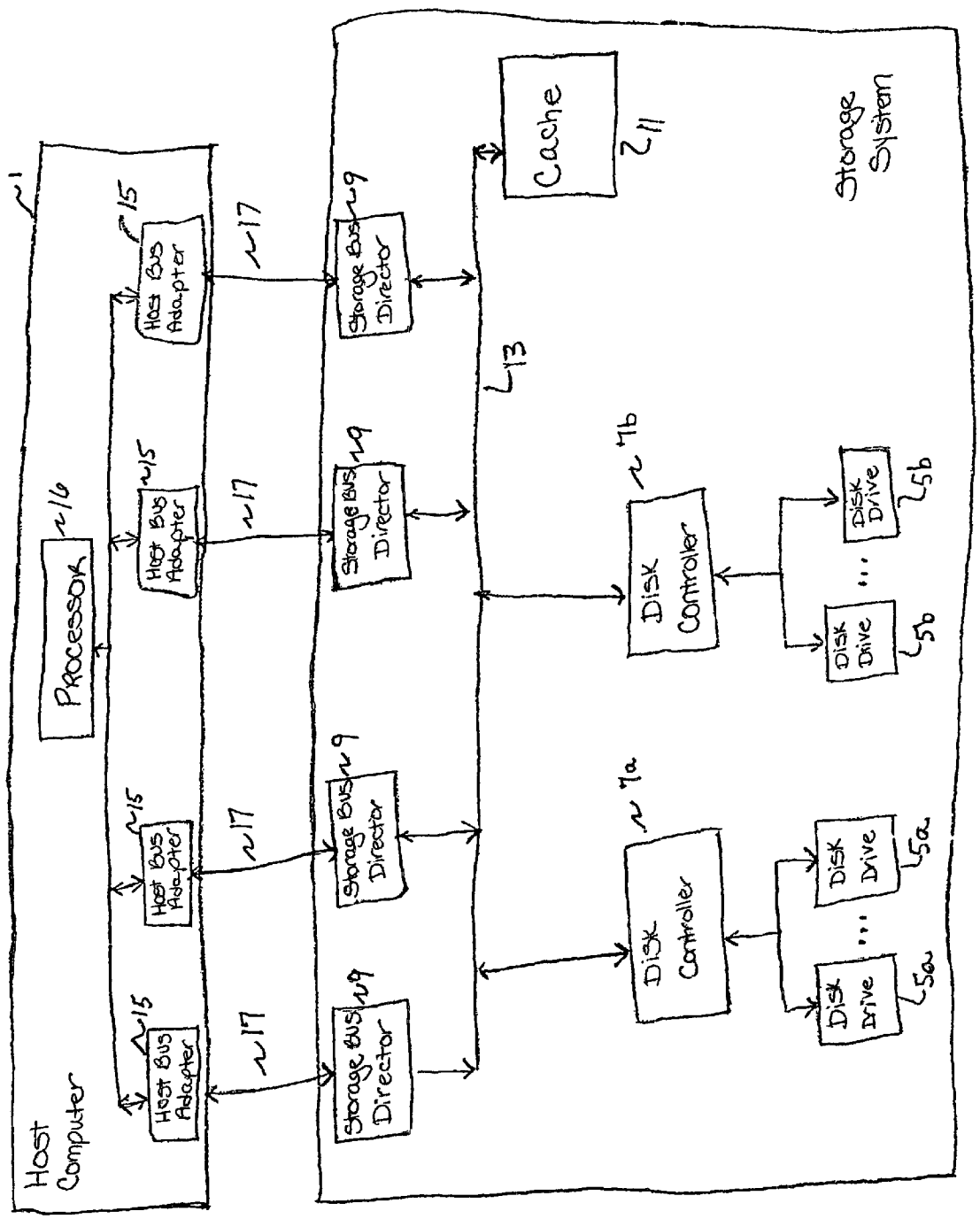
FIG. 1 is a block diagram of an exemplary computer system on which aspects of the present invention may be implemented.
Figure 2:
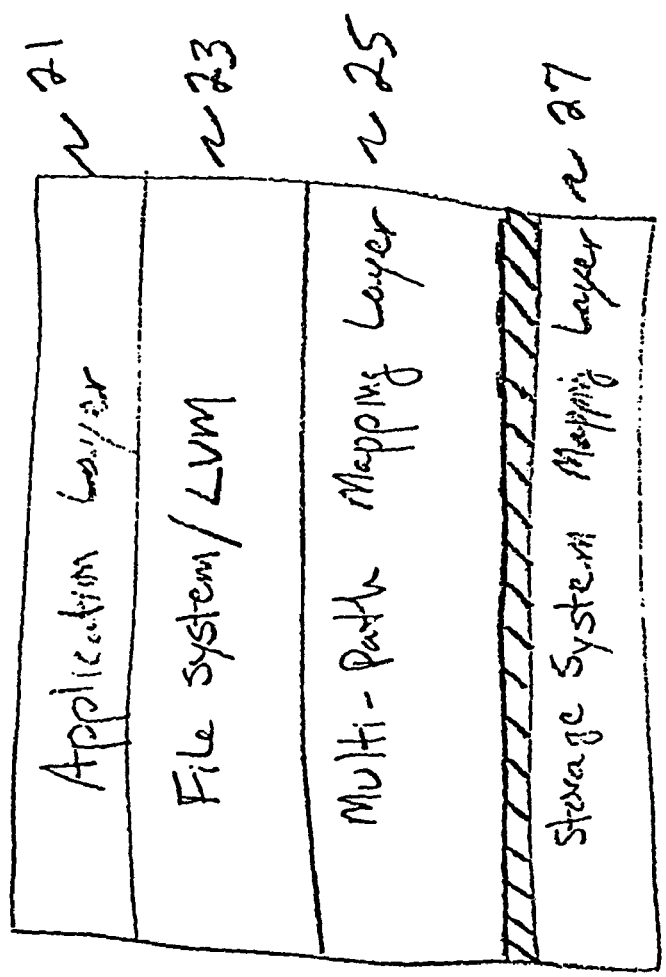
FIG. 2 is a schematic representation illustrating various layers of a mapping system that may exist in the computer system of FIG. 1.

One embodiment of the present invention is directed to an improved method and apparatus for enabling multiple host computers to share access to at least one volume of storage. In the examples discussed below, the volume of storage is described as a logical volume provided by a storage system that stores the logical volume on one or more non-volatile storage devices (e.g., the disk drives 5a-b in the storage system 3 of FIG. 1). However, it should be appreciated that the present invention is not limited in this respect and can be used to provide shared access to other volumes of storage.

Host Exporting of a Storage Volume

In accordance with one embodiment of the present invention, a volume of storage is exported by a host computer to at least one other host computer in a computer system to provide shared access to the storage volume. In one embodiment, the volume of storage exported by the host computer may be one that is provided to the exporting host by a storage system and may be stored on a non-volatile storage medium. In accordance by a storage system and may be stored on a non-volatile storage medium. In accordance with another embodiment of the present invention, the host computer that receives the exported logical volume can, in turn, export that logical volume to yet another host computer, such that a hierarchy can develop through which the logical volume is distributed throughout the computer system and made available for shared access by a number of host computers.

Figure 4:
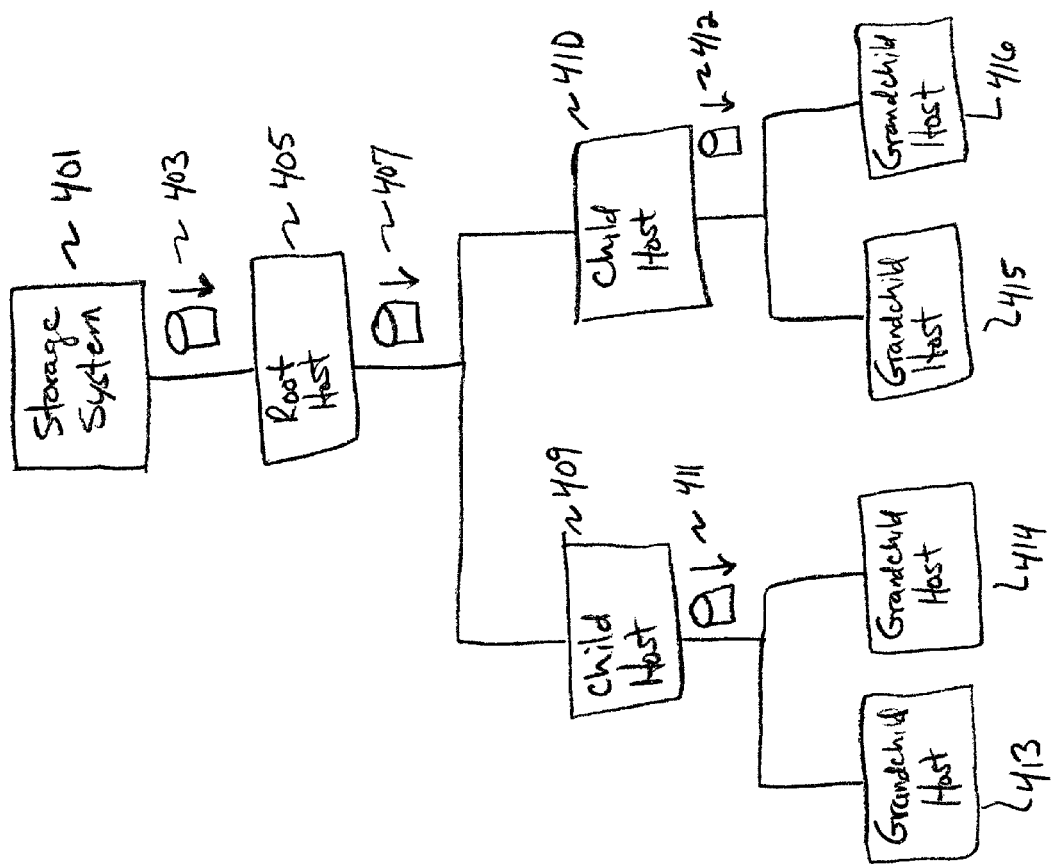
FIG. 4 is a conceptual illustration of an exemplary configuration of a distributed computer system for providing shared access to a storage volume in accordance with one embodiment of the present invention.

An illustrative computer system in accordance with one embodiment of the present invention is shown in FIG. 4, and includes a single storage system 401 and a plurality of host computers. It should be appreciated that the aspects of the present invention described herein are not limited to such a configuration, and can be employed in computer systems including numerous other configurations, including those having additional storage systems and any number of host computers. The storage system 401 can be a storage system such as the storage system 3 shown in FIG. 1, or any other type of storage system. Similarly, the host computers can take the form of the host computer 1 shown in FIG. 1, or can be any other type of host computer.

In the illustrative system shown in FIG. 4, the storage system 401 makes a logical volume 403 available for storage to a host computer 405 (identified as a root host in FIG. 4) in a conventional manner. The logical volume is represented in FIG. 4 with a standard representation for a disk, as it is conventional to refer to a logical volume presented to a host computer as a disk in view of the fact that the host computer perceives the logical volume as corresponding to a physical storage device such as a disk drive. In addition, arrows are used in FIG. 4 between the connections of the components to demonstrate which device makes a logical volume available or exports the volume to another device as discussed below.

In accordance with one embodiment of the present invention, the root host 405 then makes the logical volume available (as shown at 407) to two additional host computers 409-410 that are identified in FIG. 4 as child hosts. The reference to the host computers 409-410 as being child hosts is from the perspective of the root host 405, which exports the logical volume to the child hosts 409-410.

In the illustrative configuration of FIG. 4, each of the child hosts then in turn exports the logical volume to additional host computers identified as grandchild (again from the perspective of the root host 405) host computers in FIG. 4. In particular, the child host computer 409 exports the logical volume (as shown at 411) to grandchild hosts 413-414, and child host 410 exports the logical volume (as shown at 412) to grandchild hosts 415-416.

As mentioned above, the system configuration shown in FIG. 4 is provided merely for illustrative purposes, as numerous other configurations are possible. For example, in the configuration of FIG. 4 the root host 405 exports the logical volume to two child hosts 409-410. It should be appreciated that the present invention is not limited in this respect, and that the root host 405 can export the logical volume to a single child host or to three or more child hosts. Similarly, each of the child hosts 409-410 can alternatively export the logical volume to any number of grandchild hosts. In addition, in the configuration of FIG. 4, the system has a multi-level hierarchy, wherein the logical volume 403 is exported from the root host 405 to a layer of child hosts, and then further from the child hosts to a layer of grandchild hosts. It should be appreciated that the present invention is not limited to any particular number of hierarchy levels, as alternate embodiments of the present invention can include simply a root host and a layer of child hosts, or alternatively can include any desirable number of additional hierarchical layers below the grandchild layer illustrated in FIG. 4.

In the illustrative configuration shown in FIG. 4, a single logical volume is exported by the root host 405 and is then distributed throughout the computer system. It should be appreciated that the present invention is not limited in this respect, and that other volumes of storage can be distributed throughout a computer system using the aspects of the present invention described herein, including only sub portions of a logical volume, two or more logical volumes, or any other unit of storage.

In accordance with one embodiment of the present invention, a separate copy of the logical volume is associated with each of the host computers to which the logical volume is exported (e.g., the child hosts 409-410 and the grandchild hosts 413-416). Thus, the root host 405 can be considered to own the logical volume 403 which is presented directly to it from the storage system 401, and each of the child and grandchild hosts can be associated with its own copy of the logical volume. The copies of the logical volume can be stored in any convenient manner, as aspects of the present invention are not limited to any particular storage technique. For example, the copy of the logical volume associated with the child host 409 can be stored on any storage medium within or accessible to the child host 409.

In accordance with one embodiment of the present invention, the copy of a logical volume received by a host is stored in a storage medium (e.g., a cache) in the receiving host itself. It should be appreciated that storing the copy of the logical volume in the host itself provides performance advantages in that the host can quickly access its copy of the logical volume. However, as stated above, the present invention is not limited in this respect, as the copies of the logical volume can be stored in any suitable location.

The interconnections between the storage system 401, the root host 405 and the other host computers can be implemented in any manner suitable for enabling communication between those devices, such that special-purpose networking equipment such as that employed in a Fibre Channel fabric is not required. The communication links between the devices that define the system hierarchy can be direct communication links, or these communication links (or a subset thereof) can be implemented via any suitable network connection. Thus, the hierarchy illustrated in FIG. 4 can be implemented in a system having a configuration such as that shown in FIG. 3 where all the devices communicate via a common network, but the nature of the communications would differ, as each host in the network would not be restrained to access the shared volume from the storage system itself, but rather, each host may have the ability to access its local copy of the logical volume or by making a request of it's parent host.

Figure 3:
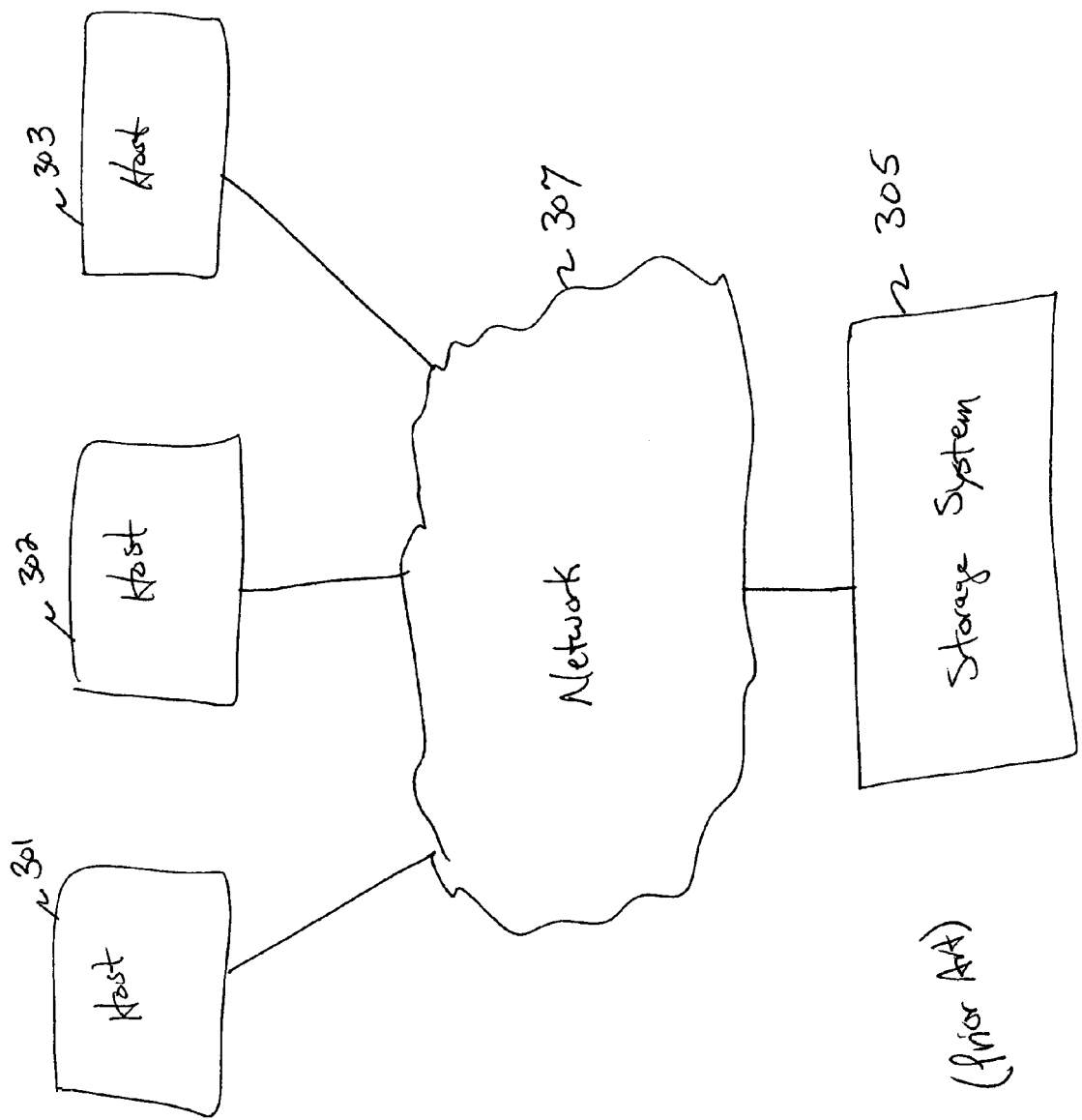
FIG. 3 is block diagram illustrating a conventional network configuration for providing shared storage access.

It should be appreciated that the embodiment of the present invention shown in FIG. 4 provides performance advantages over a conventional system such as that shown in FIG. 3, because each host can access an associated local copy of the logical volume rather than all of the host computers needing to access the logical volume from the storage system 401. This reduces the load on the storage system 401 to enable it to achieve improved performance. Furthermore, the distribution of multiple copies of the logical volume throughout the computer system can result in local copies that can be accessed more quickly, without the latencies that may be found in conventional computer network systems.

It should be appreciated that the embodiments of the present invention described above provide a technique for sharing volumes of storage in a distributed concurrent manner, such that copies of the storage volume can be distributed throughout a computer system, and such that concurrent access is provided by enabling the multiple copies of the storage volume to be accessed simultaneously. The distributed nature of the system enables the logical volume to be accessed by one of the hosts in the hierarchy (e.g., grandchild host 413 in FIG. 4) without gaining access to the volume from the storage system 401 or the root host 405. In accordance with one illustrative embodiment of the present invention described below, a communication protocol is employed so that the behavior of the shared storage volume mimics that of conventional shared volume systems such as that described in FIG. 3.

It should be appreciated that another aspect of the embodiment of the present invention shown in FIG. 4 is the scalability of the system, in that hierarchies of any configuration and depth can be formed.

In one embodiment of the present invention, copies of the logical volume exported by the root host (e.g., root host 405 in FIG. 4) and distributed throughout the computer system are available for both read and write access. It should be appreciated that the invention is not limited in this respect, as the distributed copies of the storage volume could alternatively be made available for read only access.

It should be appreciated that the embodiment of the present invention that provides write, as well as read, access to distributed copies of the storage volume is advantageous, in that performance benefits are achieved by enabling host computers in the hierarchy to perform writes to the storage volume locally. However, this provides for more challenges in terms of maintaining consistency between the multiple copies of the storage volume than is found in other distributed systems, wherein the distributed copies of a particular data set are available on a read-only basis. An example of such a read-only distributed system is a world wide web (WWW) proxy cache, wherein multiple copies of a web file stored at an origin server may be distributed to a number of proxy servers to provide read-only access for the purpose of achieving improved system performance.

Any of numerous techniques can be employed to maintain consistency among the multiple copies of the shared volume distributed throughout the computer system, and the present invention is not limited to any particular technique. In accordance with one illustrative embodiment of the present invention discussed in more detail below, each time a copy of the storage volume is updated remotely, the root host (e.g., root host 405 in FIG. 4) is notified, and the root host passes information down appropriate other branches in the hierarchy to inform the relevant hosts on those branches that their copies of the data is out of date. Alternatively, rather than invalidating the local copies of the storage volume, the root host 405 can cause the updated data to be propagated through the hierarchy so that all copies would be up to date.

The protocols discussed below for enabling communication between the hosts in the hierarchy tree and for maintaining consistency among the multiple copies of the shared volume can be implemented in the host computers themselves in any of numerous ways, examples of which are discussed below. It should be appreciated that the reference to a host computer can include any type of server or computer that accesses a volume of storage, including a file server. Thus, the root host in the hierarchy (e.g., root host 405) can be any type of server or host computer that accesses volumes of storage, and can include, for example, a file server responsible for making volumes of storage available to other hosts in the computer system.

It should be appreciated that in accordance with one embodiment of the present invention described above, a host computer (e.g., the root host 405 in FIG. 4) exports a volume of storage that it accesses (i.e., reads data from and/or writes data to) to enable shared access by other host computers. This is not done in other types of distributed systems. For example, in a web proxy cache system, the entity that is made available for distribution is a logical entity (i.e., a web file), and is not a raw unit of storage such as a logical volume or a block of a logical volume. Similarly, although other types of distributed systems (e.g., distributed file systems) may make units of storage available for distribution throughout a computer system, they do not export a unit of storage that the exporting device itself uses for storage. In this respect, the file server for a distributed file system has one or more logical volumes available to it to create the storage space available for the file system, but it is the higher level file system storage space that the file system makes available for distribution throughout the computer system. Thus, the file server in a distributed file system does not export the logical volumes themselves for distribution throughout the file system, but rather, makes available a higher level storage space, i.e., the file system storage space.

In the embodiment of the present invention illustrated in FIG. 4, the root host 405 makes available a volume of storage 403 that is presented to it by a separate storage system 401. However, it should be appreciated that the present invention is not limited in this respect, and that the root host may export a volume of storage stored on the host itself. For example, the root host server may be implemented directly on a storage system, such as the storage system 3 illustrated in FIG. 1.

A system for distributing a storage volume in accordance with the embodiments of the present invention described herein can be initially configured in any of numerous ways. For example, an administrator that controls a root host can determine which storage volumes to export, and which host computers may gain access to it. The number of child host computers for any host in the hierarchy can be selected based upon, for example, physical location of the hosts, network topology, processing and storage power of the hosts, speed of the physical network connection, or any other criteria. Thus, the number of child host computers for any host computer in the network is not limited to any particular number. Each host in the hierarchy can then receive logical volumes exported by its parent host computer and export logical volumes received from the parent host to its child host computers.

As discussed below, in accordance with one embodiment of the present invention, security techniques can be employed to ensure that only authorized users gain access to the distributed storage volume. In accordance with one embodiment of the present invention, the security techniques can include the use of encryption, such that an administrator configuring a computer system to allow shared access to a storage volume in accordance with the techniques described herein can enable access by, for example, distributing the appropriate encryption keys to host computers for which access to the shared volume is provided.

Multiple Root Embodiment

In accordance with one embodiment of the present invention, a technique is employed to provide fault tolerance for a computer system such as that shown in FIG. 4, in the event that the root host fails. In this respect, it should be appreciated that each of the host computers that accesses the shared storage volume is dependent upon the root host 405 as a vehicle for accessing the volume from the storage system 401. Thus, if the root host 405 were to fail, each of the other host computers 409-410 and 413-416 would lose its ability to access the shared storage volume.

Figure 5:
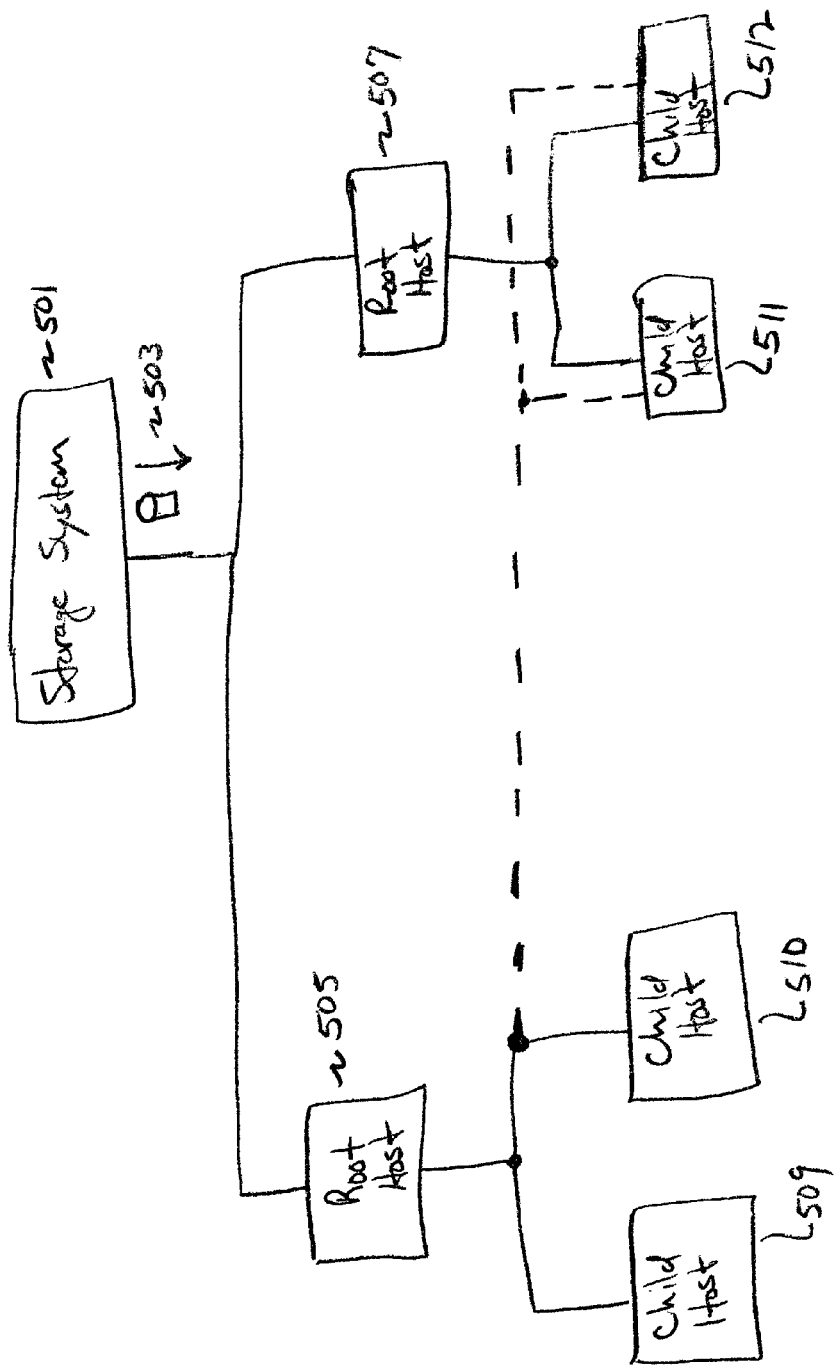
FIG. 5 is conceptual illustration of a configuration of a distributed computer system in accordance with an alternate embodiment of the present invention, wherein multiple root hosts are provided.

In accordance with one embodiment of the present invention illustrated in FIG. 5, two or more root host computers 505, 507 are employed that each has the ability to directly access the logical volume 503 from the storage system 501, and that each has the capability to export the volume to other hosts. Thus, in the event that one of the root hosts fails, the possibility exists for another root host to take over the exporting function to the child hosts of the failed root host. This is illustrated by the dotted lines in FIG. 5, such that if root host 507 were to fail, a failover technique can be employed to enable the shared volume to be provided to the child hosts 511-512 through the other root host 505. The present invention is not limited to any particular techniques for determining the failure of the root host 507, nor for providing the failover to a different root host, as any suitable technique (an example of which is described below) can be employed.

While two root hosts are shown in FIG. 5, it should be appreciated that this aspect of the present invention is not limited in this respect, and that three or more root hosts can be provided. Furthermore, although only two child hosts are shown for each of the root hosts in FIG. 5 (including child hosts 509-510 for root host 505), it should be appreciated that any number of child hosts can be provided. Finally, while only a two-level hierarchy for each of the root hosts is shown in the embodiment of FIG. 5, it should be appreciated that this aspect of the present invention can be employed with additional hierarchical levels.

Multiple Storage System Embodiment

Figure 6:
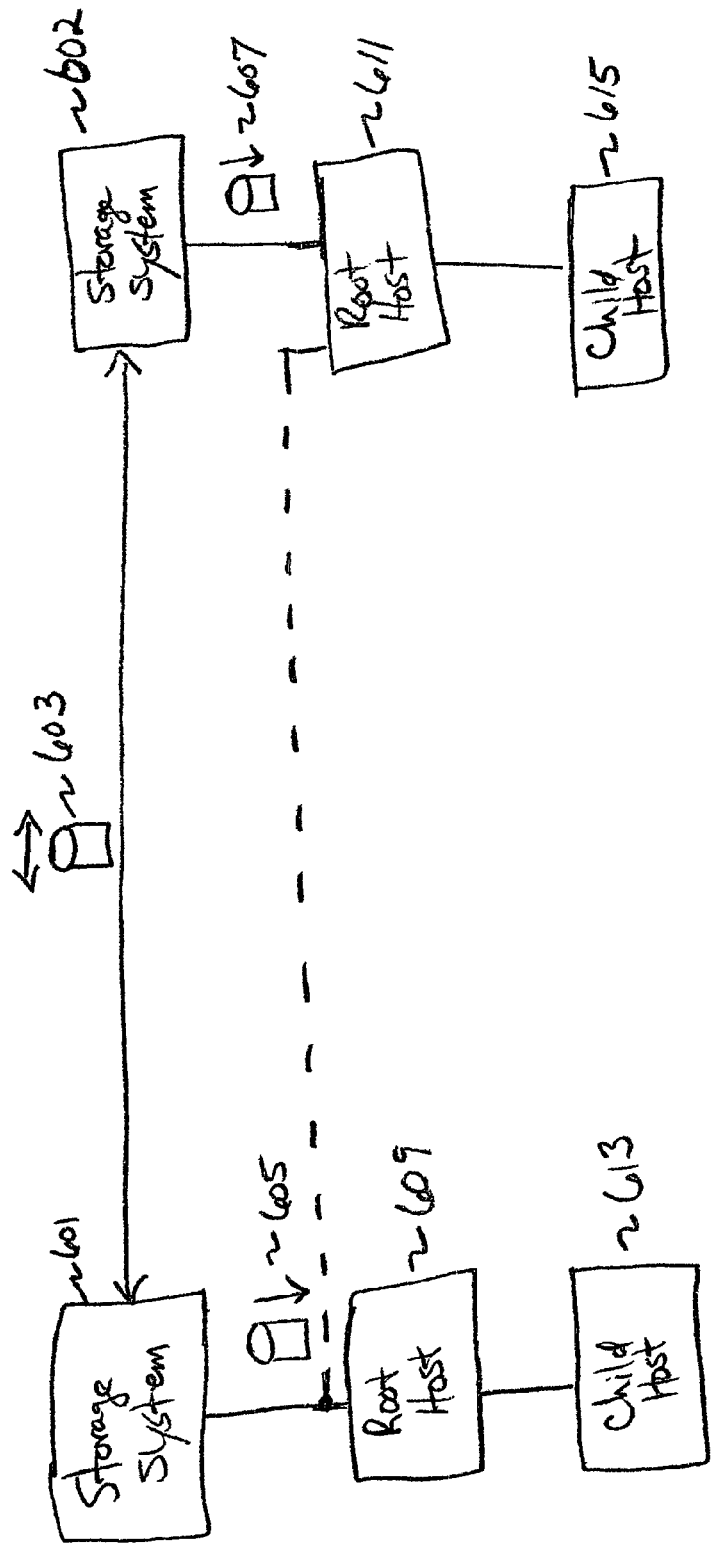
FIG. 6 is a conceptual illustration of a configuration of a distributed computer system in accordance with an alternate embodiment of the present invention, wherein the volume to be shared is stored on multiple storage systems.

Another embodiment of the present invention that provides an even greater level of fault tolerance is illustrated in FIG. 6. In this respect, in the embodiment of FIG. 5, the storage system 501 is a potential single source of failure, because if the storage system 501 fails, all of the host computers will lose access to the storage volume 503. In the embodiment of FIG. 6, at least two storage systems 601-602 are provided that each includes a copy of the storage volume 603. The storage system 601 makes the logical volume 603 available (as shown at 605) to a root host 609, and the storage system 602 makes the logical volume available (as shown at 607) to a root host 611. Each root host 609, 611 includes its own hierarchical tree of host computers to which it exports the logical volume. Although a single child host 613, 615 is shown for each of the root hosts, it should be appreciated that significantly larger and deeper hierarchical configurations can be provided underneath each root host. Since multiple storage systems have a copy of the storage volume 603, in the event that one of the storage systems fails (e.g., storage system 602), a failover can occur so that the associated root host (e.g., 611) can gain access to the storage volume through another storage system (e.g., storage system 601), as identified by the dotted line in FIG. 6.

It should be appreciated that the aspect of the present invention illustrated in FIG. 6 is not limited to any particular technique for maintaining copies of the storage volume 603 on multiple storage systems. This can be done in any of numerous ways. An example of a technique for maintaining multiple copies of the storage volume 603 is to use a remote data facility, such as the Symmetrix Remote Data Facility (SRDF) available from EMC Corporation, Hopkinton, Mass., in which the storage systems themselves can maintain consistency between two copies of the storage volume.

It should be appreciated that one aspect of the embodiments of the present invention illustrated in FIG. 5 and FIG. 6 is that at least two host computers (i.e., root hosts 505 and 507 in FIG. 5 and 609 and 611 in FIG. 6) export copies of the same storage volume to other host computers in the computer system.

Node Hierarchy and Block-Level Access

Figure 7:
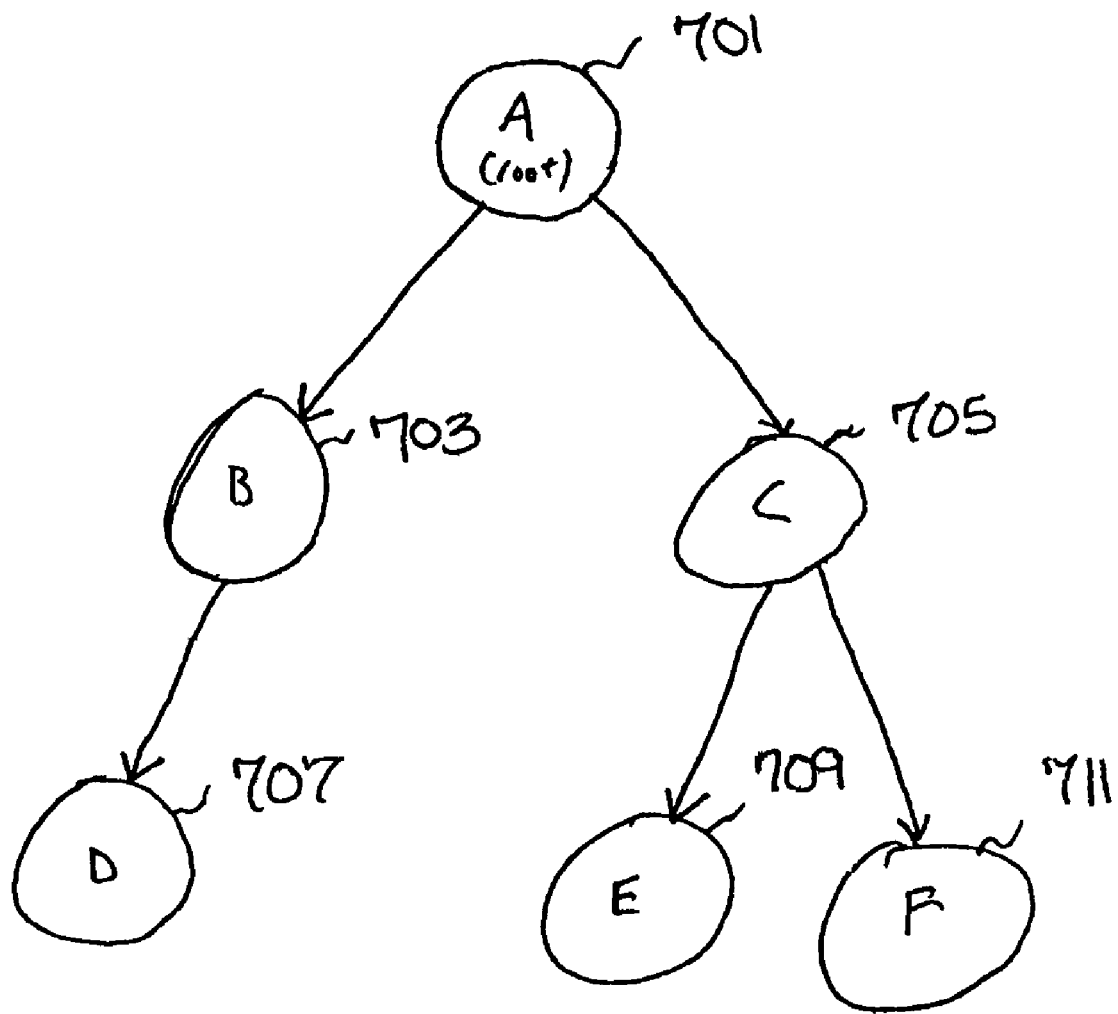
FIG. 7 is a conceptual node hierarchy representation of a distributed computer system in accordance with one embodiment of the present invention.

As should be appreciated from the foregoing, in accordance with one embodiment of the present invention, a hierarchical configuration can be formed within a computer system to distribute a shared volume of storage. This can be represented as a hierarchy of nodes as illustrated in FIG. 7, wherein each node represents a host computer in the computer system. Each node in the hierarchy can access the shared storage volume from an associated local copy (e.g., stored on a cache in the host computer itself). Each node in the hierarchy can receive data from its parent and export data to its children. For example, in the configuration of FIG. 7, node C 705 receives data exported by its parent (node A 701) and exports data to its children (node E 709 and node F 711).

As discussed above, in one embodiment of the present invention, an entire copy of the logical volume is exported and maintained at each local copy within the distributed computer system. However, the present invention is not limited in this respect, as a different level of granularity can be employed. In accordance with one illustrative embodiment of the present invention, the level of granularity is specified at the block level, with the block size being any desirable size (e.g., 512 bytes). In this manner, only particular blocks of data used by various host computers in the distributed computer system need be transmitted to particular locations and stored therein, thereby reducing the need to transfer data through the computer system unnecessarily.

For example, referring to FIG. 7, node A 701 can be the root for a particular logical volume. If an application running on node E 709 requires access to a particular block within that volume, it can request access to that block from its parent node (i.e., node C 705). If the requested block is stored locally at node C 705, then node C 705 can provide the block directly to node E 709, without needing to involve any nodes at a higher level in the hierarchy (i.e., node A 701 in the example of FIG. 7). If node C 705 does not have the desired block in its local copy, it can request the block from its parent node (i.e., node A 701 in the example of FIG. 7). Upon receipt of the requested block, node C 705 can either simply pass it to the requesting node E 709, or it can do so and also include the block in its local copy of the exported logical volume. If the node C locally stores the block, it can directly access that block from its local copy in the event that the node C or its other child (node F 711) may later seek to access that block, such that node C 705 would not need to again return to node A 701 to gain access to the block.

As discussed above, the aspects of the present invention described herein are not limited to exporting an entire logical volume, as subsets of volumes (e.g., blocks) may be exported. Thus, it should be appreciated that various portions of a logical volume (e.g., different blocks) might be exported differently, such that different hierarchies can be developed to distribute different portions of a logical volume throughout the computer system.

In accordance with one illustrative embodiment of the present invention, for each portion of data stored locally, the node also stores metadata identifying the data. For example, when data is stored at the block level, the metadata can identify the logical volume to which the block belongs, as well as the blocks location within the logical volume. In addition, other types of information may be stored to facilitate the communication protocol used in distributing the data throughout the computer system and maintaining its consistency. While the present invention is not limited to the use of any particular types of such information, examples that can be employed in a manner described below include the identity of the parent node from which the block was received, the identify of the child nodes to which the block is being exported by the node, and information that assists in security and authentication to control access to the data (e.g., encryption keys, checksums, etc.).

As discussed above, it should be appreciated that the hierarchies of nodes can be defined independent of the underlying technology used to interconnect the host computers within the storage system.

For example, the nodes illustrated in FIG. 7 may be directly connected as shown, or may be connected in a star topology, a ring topology, a bus topology, or any other network topology. The network topology is not important as long as each node can send data to and receive data from its parent node and its child nodes. Additionally, any suitable networking technology can be used. For example, the network may be an Ethernet network, an Asynchronous Transfer Mode (ATM) network, a Fiber Distributed Data Interface (FDDI) network, or any other suitable network.

Illustrative Communication Protocol

As discussed above, one embodiment of the present invention is directed to a communication protocol that facilitates communication between the nodes in a computer system implementing aspects of the present invention, and further facilitates maintaining consistency among multiple copies of a storage volume that may be distributed throughout the computer system. It should be appreciated that the other aspects of the present invention described herein are not limited to using this (or any other) particular protocol.

In accordance with one illustrative embodiment of the present invention, a protocol is employed that performs a write lock when one of the nodes seeks to update a copy of a distributed storage volume to assist in maintaining consistency. A simple example is now described referring to the illustrative configuration of FIG. 7. Referring to FIG. 7, assume that a particular block of a logical volume is stored in both nodes B 703 and C 705. As will be discussed in more detail below, this information is known to node A 701, as each parent node carries with it information identifying the blocks within its children. In accordance with one illustrative embodiment of the present invention, a write from node C 705 to the shared block involves the following steps.

First, node C 705 issues a write request to its parent node A 701. Second, node A 701 issues an invalidate command to node B 703. In response, node B invalidates (i.e., makes unavailable) its local copy of the shared block, and then returns an invalidate reply message to node A 701 specifying that the shared block has been invalidated in node B. Finally, node A 701 then issues a write reply to node C 705, authorizing node C to proceed with the write that updates its local copy.

It should be appreciated from the simple example described above that the communication protocol performs a lock on the block to be updated, such that the node C 705 is not authorized to actually perform the write until other copies of the block (only the copy in node B 703 in the simple example described above) have been invalidated. This prevents a circumstance where node C 705 performs a write to the block and another node subsequently performs an out-of-date read on its local copy.

The simple example discussed above illustrates a handful of commands that can be executed by the nodes, including a write request, an invalidate, an invalidate reply and a write reply. In accordance with one illustrative embodiment of the present invention discussed below, several other types of commands are also possible, the functionality of each of which is discussed below.

In the simple example discussed above for a write from node C 705, only three nodes were involved, i.e., root A 701, node B 703 and node C 705. However, the communication protocol in accordance with one aspect of the present invention is capable of handling operations in significantly deeper and more complex hierarchies. One aspect of the present invention that simplifies such operations relates to each node limiting its knowledge to the nodes directly adjacent to it (i.e., parents or children of the node). This greatly simplifies matters, such that each node is not required to carry excessive amounts of information. Thus, each of the nodes can act in essentially the same manner as the example described above.

For example, referring again to the illustrative configuration of FIG. 7, assume that node F 711 seeks to perform a write to a block that is also found in each of the other nodes in the system. The node F 711 will issue the write request to node C 705, which will in turn issue the write request to node A 701. Node A 701 will issue an invalidate to node B 703, which will in turn issue an invalidate to the node D 707. In accordance with one embodiment of the present invention, the root node A 701 is only aware that the shared block has been distributed to node C 705, and does not know anything about the lower levels in the hierarchy. However, node C 705 does have this information, and as such will issue an invalidate to the node E 709. Node C 705 will then wait for an invalidate reply from node A 701, as well as one from node E 709, and once it receives indications that all of the other copies have been invalidated, it will issue the write reply to node F 711. Thus, when viewed on a node-by-node basis, it can be seen that the protocol discussed above is readily scalable to any configuration, with relatively simple analysis at each node.

In accordance with one embodiment of the present invention, the distributed shared data and the message sent pursuant to the communication protocol each is indexed by logical volume and block number to facilitate communication. Of course, the present invention is not limited in this respect, as other indexing techniques are possible.

A detailed explanation will now be provided of one embodiment of the invention for providing a protocol for communication between the nodes. The detailed explanation will include a number of fields and instructions for communication between the nodes. It should be appreciated that this level of detail is provided only as an example, and that the embodiments of the present invention described herein are not limited to employing a protocol that includes these precise commands, or these precise instruction formats.

Each message in the protocol can be sent with a common message header. The message header may include several fields which provide information about the message. Table 1 illustrates an example of fields suitable for use in a message header and the format of such fields. The hdrOpcode field is a one byte integer field which indicates the opcode of the message being sent. For example, the message may be an IO_REQUEST, OK_REPLY, or ERR_REPLY, each of which is discussed below in greater detail. The hdrHopsLeft field is a one byte integer field which indicates the number of hops (i.e., level in the hierarchy through which the message is transmitted) remaining before a message can receive a successful reply. Each recipient of the message can decrement this value by one. When the value reaches zero, the recipient may respond to the original requester. The hdrFlags field is a two byte bitfield which includes flags that indicate how the message should be handled. For example, flags that may be defined in the hdrFlags field are a FORCE_SYNC flag which indicates that the recipient must flush data all the way to the volume root, a PARAMS flag which, if set, indicates that the message includes parameters, and a RECOVERY_OP flag which includes information about recovery. The hdrOrigIP flag is a four byte field which indicates the IP address of the message's originator. It should be noted that the hdrOrigIP field is intended for use in an IP network. However, if using another network protocol, for example NetBIOS or NetBEUI, the appropriate network address of the original requester may be stored in this field. The hdrXID field is a four byte integer which includes a number generated by the requester to distinguish the message from other messages. When sending a message that is a reply to a received request message, the number stored in the hdrXID field is taken from the corresponding request message and is not generated by the responder.

TABLE 1

| Field | Format | Size (bytes) |
|---|---|---|
| hdrOpcode | integer | 1 |
| hdrHops Left | integer | 1 |
| hdrFlags | bitfield | 2 |
| hdrOrigIP | IP address | 4 |
| hdrXID | integer | 4 |

In addition to a message header, messages may include parameters. Parameters are values which provide information useful in completing a request. As mentioned above, the type of request is indicated in the hdrOpcode field. The parameters that are included with the message may vary depending on which type of request is sent. An example format for a parameter is shown Table 2. Each parameter may include a paramType field, which indicates the type of the parameter. For example, the parameter may be VOLUME_ID, PERMISSIONS, or TTL. Parameter types will be discussed in more detail below. The paramLen field indicates the size in bytes of the paramData field. The paramData field includes the actual value of the parameter. Some parameters may have fixed size data while others have variable sized data.

TABLE 2

| Field | Format | Size (bytes) |
|---|---|---|
| paramType | integer | 2 |
| paramLen | integer | 2 |
| paramData | untyped | variable |

Table 3 is an example of parameter types and their format which may be sent with messages. It should be understood that other parameter types and formats can be used and the invention is not limited to any particular parameter types or formats.

TABLE 3

| Parameter Type | Format of Value | Size of Value (bytes) |
|---|---|---|
| VOLUME_NAME | string | variable |
| VOLUME_ID | integer | 4 |
| CONNECT_FLAGS | bitfield | variable |
| BLOCK_NUM | integer | 2 |
| PERMISSIONS | integer | 2 |
| DATA | untyped | variable |
| VERIFIER | bitfield | variable |
| KEY | N/A | N/A |
| TTL | integer | 4 |
| HB_TTL | integer | 4 |
| STATUS | integer | 2 |
| ERR_PARAM | integer | 2 |
| ERR_VALUE | bitfield | variable |
| END_MSG | N/A | 0 |

VOLUME_NAME is parameter which indicates the name of the volume to which the message pertains.

The value of the VOLUME_ID parameter is an four byte integer identifying the volume to which the message pertains.

The value of the CONNECT_FLAGS parameter is variable-length bitfield which contains flags for a volume. There are two types of these flags. One type is option flags which can be used to request optional protocol features. Option flags include SYNC_WRITE and ASYNC_WRITE. If the SYNC_WRITE flag is set, all data writes must propagate all the way to the root node of the hierarchy before being acknowledged. If the ASYNC_WRITE flag is set no propagation is required for acknowledgement. The other type of CONNECT_FLAGS are information flags. Information flags provide information about server or volume characteristics. For example, information flags could include an IS_ROOT flag which indicates that a node is the root of a hierarchy or an IS_PROXY flag which indicates that a node is not the root of a hierarchy and has a parent. The IS_ROOT and IS_PROXY flags may be sent by a node in response to a CONNECT message. These flags may be used during recovery to help determine to which node a disconnected node may reconnect. For example, when a node detects a failure of its parent, if it is aware that its parent is a proxy, the node can appreciate that there will be another node in the hierarchy to which it can reconnect (e.g., the parent of the failed node). Alternatively, if the node detects that its failed parent was the root node, unless the system is one in which there are multiple roots present, the node will recognize that it will be unable to reconnect to any node. Furthermore, if the system is a multi-root system, then the node will recognize that it should engage in the error recovery steps appropriate for connecting to a different root.

The BLOCK_NUM parameter may include the block number within a volume to which the message pertains.

The PERMISSIONS parameter is used to indicate the rights that the sender or recipient of a message has to a block after the current request. The values of this parameter may be expressed as a two byte integer. A value of NO_PERMS means that the node should have no permissions to the block. Such a value could be used to revoke a nodes permissions to a block to allow another node to access the block. A value of READ_PERMS indicates that the node has read only permissions to a block. A value of WRITE_P-ERMS indicates that the node has read and write permissions to the block.

It should be appreciated that the PERMISSIONS for a node to read or write on a block refers to a particular point in time, as opposed to an initialization configuration where some nodes may be provided with only read access. The initialization configuration can be provided by providing the necessary security and authentication information (e.g., encryption keys) only to nodes authorized to perform certain operations (e.g., write operations). However, it should be appreciated that at particular points in time, a node that is configured with write privileges may not have permission to write to a particular block. Thus, the PERMISSIONS parameter is designed to provide a node with the ability to perform a write at a particular point in time. Similarly, although a node may be configured with read access, there may be particular points in time (e.g., when a block has been invalidated) when a node will not have the ability to perform a read on a particular block. Thus, the value of the READ_PERMS parameter will indicate whether a node has permission at a particular point in time to read a block.

Furthermore, as discussed above, in one embodiment of the present invention, the PERMISSIONS to be provided to a lower-level node in the hierarchy are first granted to the parent of that node, which then distributes it down the hierarchy to the appropriate node. It should be appreciated that there may be circumstances where a node will have write PERMISSIONS, but will not be configured to perform a write operation. This is done so that the node will have the ability to pass the write permissions down to lower nodes in the hierarchy, which may be configured to perform write operations. An example of this is the use of an untrusted node in the hierarchy, which may have write permissions so that it has the capability of providing those write permissions to lower nodes in the hierarchy. Nevertheless, because it does not include the necessary authentication and security access (e.g., appropriate encryption keys), possessing the write permissions does not give the untrusted nodes sufficient authority to actually perform a write.

The value of the DATA parameter may be the actual data contents of a block or multiple blocks. For example, in response to a read request for a block of data, a node can respond with a message that includes the block of data in the paramData field of the message.

The value of the VERIFIER parameter can be used to determine if data sent in the message is valid and authentic. The value is represented as a variable length bitfield, whose length is determined by an external process. The VERIFIER value may include a checksum of the data or encryption and decryption keys. This can be used for security purposes as discussed in greater detail below.

The KEY parameter is also used in data validation. The KEY parameter may include encryption and decryption keys for authenticating data. The length and structure of the KEY value is determined by an external process.

The value of the TTL parameter is four byte integer which indicates the amount of time that any data or permissions being provided should be considered valid. This parameter can be used, for example, to ensure that permissions expire on a child node before they expire on the parent node.

The value of the HB_TTL parameter is also a four byte integer which is similar to the TTL parameter, except that it is used to control a global TTL (time to live) for all blocks received from a parent, instead of on a per-block basis.

The STATUS parameter has a two byte integer value which can be used in an ERR_REPLY message to indicate the type of error. Although any type of error value may be used, certain error values may be predefined. Example error values and their meanings are shown in Table 4.

TABLE 4

| Error Value | Description |
| --- | --- |
| INVALID_HEADER | The message header was invalid |
| BAD_PARAM_ID | A required parameter was encountered that the recipient node did not recognize |
| BAD_PARAM_LENGTH | A parameter length was incorrect |
| BAD_PARAM_VALUE | A parameter's value did not match any of the allowed values |
| LOOP_DETECTED | A loop was detected when forwarding a request (e.g., if the sender receives his own request back with hdrhopsleft = 0). |
| BAD_VERIFIER | The verifier did not match the data. If a node sends a phony verifier or check sum of the data, it will receive this error/message. |
| IN_RECOVERY | A request was received for a block that was frozen as part of the recovery process |

The ERR_PARAM parameter (again referring to Table 3) is a two byte integer which indicates the parameter number of the parameter identified in the STATUS parameter when the STATUS parameter identifies a bad parameter with a value of BAD_PARAM_ID, BAD_PARAM_LENGTH, or BAD_PARAM_VALUE.

The value of the ERR_VALUE parameter is a variable length integer which indicates the reason that a parameter resulted in a BAD_PARAM_VALUE. For example, if a BAD_PARAM_VALUE resulted from an unrecognized bit being set in a bitfield parameter, the ERR_VALUE parameter may indicate which bit the recipient failed to recognize.

The END_MSG parameter has an empty value (i.e., size of the value is 0), which indicates that no more parameters are present in the current message. The END_MSG parameter is typically the last parameter provided, if the PARAMS flag is set in the message header flags.

As mentioned above, the message header includes a hdrOpcode field (Table 1) which indicates the type of message being sent. Table 5 is an example of possible opcode types which may be sent in a message.

TABLE 5

| Opcode Type |
| --- |
| CONNECT |
| DISCONNECT |
| IO_REQUEST |
| OK_REPLY |
| ERR_REPLY |
| INVALIDATE |
| PUSH |
| HEARTBEAT |
| FORWARD |

A CONNECT message is a message that a node initially sends to another node to establish the sending node as part of the distributed hierarchy. The sending node may also send a VOLUME_ID or VOLUME_NAME parameter to the receiving node to identify which logical volume it seeks to share access to, and to which subsequent IO_REQUEST messages will pertain. The receiving node may respond to a CONNECT message with an OK_REPLY message, including a CONNECT_FLAGS parameter, a KEY parameter, a VOLUME_NAME parameter, and a VOLUME_ID parameter. The CONNECT and OK_REPLY messages allow the child and parent to establish use of protocol features such as synchronous or asynchronous writes, as defined in the CONNECT_FLAGS parameter discussed above. The CONNECT message also informs the receiving node of the presence of the sending node. A CONNECT message is only sent upstream. That is, it is only sent from a client node to a parent node.

A DISCONNECT message is used to close a connection established by a previous CONNECT message. VOLUME_ID may be provided as a parameter with a DISCONNECT message to identify the volume for which disconnection is sought. The receiving node may respond to a DISCONNECT message with VOLUME_NAME, VOLUME_ID, and PARENT_ID parameters. The receiving node may also supply a CONNECT_FLAGS parameter in response to a DISCONNECT message.

In one embodiment, five types of IO_REQUEST messages are supported.

First, a GET message can be used by the sending node to request a block of data from the receiving node. The sending node may also request permissions using the PERMISSIONS parameter discussed above to obtain either read or write permissions for the requested block of data, and may indicate the volume and block number requested using the VOLUME_ID and BLOCK_NUM parameters. An OK_REPLY message may be sent by the receiving node in response to a GET message, including TTL (i.e., how long data is valid) and DATA parameters. VOLUME_ID and BLOCK_NUM parameters may also be provided in the reply for error-checking and logging purposes. When a GET message is sent seeking write permissions, this will be interpreted generally as a write request, and will trigger the invalidation steps discussed above. Thus, when the OK_REPLY message is returned to the node that issued the GET message and returns write permissions, the node can perform the write immediately, as the invalidation steps have already occurred.

PUT is another type of IO_REQUEST used by a sending node to write data to the receiving node, and is issued when the sending node does not yet posses write permissions. Like the GET message, the PUT message includes PERMISSIONS, VOLUME_ID, and BLOCK_NUM parameters. Because PUT messages are used to write data, the DATA parameter may also be included. An OK_REPLY message from the receiving node may include TTL and PERMISSIONS parameters as well as VOLUME_ID and BLOCK_NUM. It should be appreciated that a PUT is another form of write request, which will result in the invalidation steps discussed above. Thus, when the OK_REPLY message is received by the node that issued the PUT and it includes write permissions, the receiving node will have the ability to perform the write immediately, as the invalidation steps will have already been performed.

A third type of IO_REQUEST is FLUSH. A FLUSH is similar to a PUT, except that the node already has valid write permissions to the block it wishes to modify. Thus, it is not necessary to invalidate other nodes' copies of the block, as these copies were invalidated when the writing node initially received the write permissions. Parameters that may be provided with a FLUSH message include VOLUME_ID, BLOCK_NUM, and PERMISSIONS.

A fourth type of IO_REQUEST is LOCK. A LOCK message allows a node to lock a particular block within a volume. For example, if a node already has a copy of a block with read permissions and then wishes to write to the block, the node may issue a LOCK message with the (PERMISSIONS) parameter having a value of WRITE_PERMS. As a result, any other nodes with a valid copy of the block can invalidate their copies of the block and an OK_REPLY message may be sent to the node granting write permissions. The LOCK message can also be used by a node to give up any permissions held by that node. In this scenario, the value of the PERMISSIONS parameter of the LOCK message issued by the node would be NO_PERMS.

Another use for the LOCK message is to provide a locking protocol that enables two or more applications to gain control over a shared resource of any type. In this respect, although the aspects of the present invention have been described herein in connection with a system for distributing a volume of storage, it should be appreciated that the techniques disclosed herein provide a distributed lock system that can be used to enable two or more applications to gain control over a shared resource, independent of whether the lock is associated with a volume of storage. Thus, in accordance with one embodiment of the present invention, the techniques described herein can be employed to provide an infrastructure to provide a distributed lock for other applications (e.g., a shared database) in which a volume of storage is not distributed. For example, the techniques described herein can be employed to define a fake volume of storage that has no data associated with it, to enable the infrastructure described herein to be employed to perform a distributed lock.

A final type of IO_REQUEST is RECOVER. RECOVER messages are used to restore permissions that might have been lost due to a node's failure. Recovery operations will be discussed below in greater detail.

The OK_REPLY message is used as a response to a message to indicate that the request or message was successful. Parameters included with an OK_REPLY message may vary depending on which type of message the OK_REPLY message is responding to.

An ERR_REPLY message may be used as a response to a message to indicate that the request or message was not successful. Parameters which may be included in an ERR_REPLY message are STATUS, ERR_PARAM, and ERR_VALUE.

An INVALIDATE message may be used to revoke existing permissions that a node has to a particular block. The INVALIDATE message may include VOLUME_ID, BLOCK_NUM, and PERMISSIONS parameters. A node receiving an INVALIDATE message may reply with an OK_REPLY message including a PERMISSIONS parameter, if the node is giving up more PERMISSIONS than required by the INVALIDATE message.

A PUSH message may be used when data is sent to a node in anticipation of demand for that data. For example, instead of a node requesting data with a GET message, the node may be sent data with a PUSH message. Parameters sent with a PUSH message may include VOLUME_ID, BLOCK_NUM, DATA, and PERMISSIONS.

A HEARTBEAT message can be used to update a node's global TTL (i.e., the time that data and/or permissions are valid). It is not necessary to include parameters with a HEARTBEAT message. When a node sends a HEARTBEAT message to a receiving node, the receiving node responds with an OK_REPLY message include a HB_TTL parameter. The value of this parameter can be used to update the sending node's global TTL.

A FORWARD message is used in semi-synchronous writes, which will be described below in greater detail. The FORWARD message may include a BLOCK_NUM parameter to indicate a block to be sent to a parent node.

Writes, such as GET or FLUSH operations may be performed synchronously, asynchronously, or semi-synchronously. Synchronous writes may be selected globally by setting the SYNC_WRITE flag in the CONNECT_FLAGS (Table 3) parameter of a CONNECT message, or may be used for a single write operation by selecting the FORCED_SYNC flag in the message header of an IO_REQUEST message. When a node performs a synchronous write, the write request must propagate all the way to the volume root before the node receives acknowledgement that the write was successful. For example, referring to FIG. 7, if node E 709 sends a synchronous PUT request to node C 705, node C 705 sends a PUT request to node A 701, the root of the volume, and receives an OK_REPLY message from node A before it sends an OK_REPLY message to node E 709.

In an asynchronous write, which may be selected globally by setting the ASYNC_WRITE flag in a CONNECT message, the data need not be propagated beyond the local node. For example, in performing an asynchronous write, node E 709 may send a PUT request to node C 705, and node C 705 may reply directly with an OK_REPLY message after the above-described invalidation steps have taken place to ensure consistency.

Semi-synchronous writes provide some of the security of a synchronous write, but without the overhead and associated performance impact of synchronous writes. Specifically, in a semi-synchronous write, the data is propagated to the parent node (but no further) before the requesting node receives acknowledgement that the write was successful. In this manner, the semi-synchronous write ensures that data is stored in at least two places in the hierarchy (i.e., the local node and its parent) to provide some degree of fault tolerance, but does not have the overhead in terms of increased network traffic and time delay associated with a fully synchronous write. In accordance with one illustrative embodiment of the present invention, once a node has executed a semi-synchronous write, it is responsible for ensuring that the data remains in at least two locations in the hierarchy. Thus, if the local node that initially wrote the data decides later to remove the corresponding block from its local copy of the storage volume, it instructs its parent node to propagate the block of data to at least one other node in the hierarchy. This can be done in any of numerous ways. For example, the node that initially wrote the block data may send a FORWARD message to its parent node, instructing the parent node to propagate the written block of data up one level in the hierarchy.

If a node receives an IO_REQUEST for a block that conflicts with the permissions that it has already given out to other nodes, it may be desirable to invalidate the block in the other nodes. For example, if a node received a request for write PERMISSIONS to a particular block after the node had already given write PERMISSIONS to that block to a different node, this request would conflict with the write permissions already given out. If the request conflicts with its own permissions to the block, it may send a request to its parent to obtain expanded permissions for the block. If the request conflicts with any permissions it has given out to its children, it may send INVALIDATE messages to the nodes with those previously distributed permissions, and await responses from all those nodes before responding to the original IO_REQUEST as discussed above.

Several examples of nodes communicating with the above-described communication protocol will now be described. The examples will be described referring to the node hierarchy illustrated in FIG. 7. However, it should be appreciated that this node hierarchy is chosen only as an example, and the communication protocol may be used with many other node configurations. Furthermore, it should be appreciated that many other types of communications are possible using the commands and protocol discussed above, as the present invention is not limited to these examples.

EXAMPLE ONE

A first example will be described wherein a node requests a block for reading from its upstream neighbor. Node E 709 (FIG. 7) wishes to obtain a copy of block of "volume_X" for reading. This may be accomplished, for example, by the following message exchange:

1. Node E 709 sends a CONNECT request to its parent, node C 705:

VOLUME_NAME="volume_X"

2. Node C 705, lacking information about volume_X, sends its own CONNECT request to node A 701:

VOLUME_NAME="volume_X"

3. Node A 701 responds to node C 705 with an OK_REPLY, giving a volume ID based on an internal device number.

VOLUME_NAME="volume_X"

VOLUME_ID=32002

HB_TTL=30 seconds

4. Node C 705 receives node A's OK_REPLY and constructs one for node E 709. Note that the volume ID this time might not match the one from the previous message. In this respect, in accordance with one embodiment of the present invention, a node has the ability to map the volume ID and/or block number from the identifiers used by the nodes below it, to different volumes and/or blocks. This mapping may be useful for any of numerous reasons, and this embodiment of the present invention is not limited to any particular usage.

VOLUME_NAME="volume_X"

VOLUME_ID=26924852

HB_TTL=30 seconds

5. Node E 709 receives node C's OK_REPLY. Now that it has the volume ID, it can send an IO_REQUEST to get the desired block.

OPCODE=GET

VOLUME_ID=26924852

BLOCK_NUM=7

PERMISSIONS=READ_PERMS

6. Node C receives the IO_REQUEST from node E 709, and sends one on to node A 701. Note that the volume ID is mapped back to one that node A 701 will understand.

OPCODE=GET

VOLUME_ID=32002

BLOCK_NUM=7

PERMISSIONS=READ_PERMS

7. Node A 701 receives the IO_REQUEST from node C 705, and returns an OK_REPLY. Note that the VOLUME_ID and BLOCK_NUM are optional; node C 705 should be able to determine from the original request's ID (repeated in the reply's header) what volume and block number are involved.

VOLUME_ID=32002

BLOCK_NUM=7

PERMISSIONS=READ_PERMS

TTL=1200 seconds

HB_TTL=30 seconds

8. Node C 705 receives the OK_REPLY from node A 701, keeps a copy of the data for itself, and sends its own OK_REPLY to node E 709. Note that the TTL is reduced to account for the round-trip time between C and A (2 seconds), but the HB_TTL requires no such adjustment.

VOLUME_ID=26924852

BLOCK_NUM=7

PERMISSIONS=READ_PERMS

TTL=1198 seconds

HB_TTL=30 seconds

EXAMPLE TWO

In a second example, node F 711 requests a copy of the same block transferred in the above-described example. Assume that this example occurs at the end of the above-described example (i.e., after node E 709 has connected to node C 705 and received a copy of the block). Node F may obtain a copy of the block using, for example, the following message exchange.

1. Node F 711 sends a CONNECT message to its parent, node C 705.

VOLUME_NAME="volume_X"

2. Node C 705 already knows about volume_X this time, so it responds with an immediate OK_REPLY.

VOLUME_NAME="volume_X"

VOLUME_ID=26924852

HB_TTL=30 seconds

3. Node F 711 now sends an IO_REQUEST to node C 705.

OPCODE=GET

VOLUME_ID=26924852

BLOCK_NUM=7

PERMISSIONS=READ_PERMS

4. Node C 705 already has a copy of this block, and the new request does not conflict with the copy already given out to node E 711. There is no conflict because node E 711 obtained only read permissions and node F 711 is requesting only read permissions. If, for example, node F had requested write permissions a conflict would exist, as will be illustrated in later examples. Because no conflict exists, node C 705 replies immediately with an OK_REPLY. Note that the TTL has changed again to reflect the time between node E's request and node F's request.

VOLUME_ID=26924852

BLOCK_NUM=7

PERMISSIONS=READ_PERMS

TTL=1150 seconds

HB_TTL=30 seconds

EXAMPLE THREE

In a third example, a synchronous write will be described assuming that the previous two examples have already occurred. That is, node E 709, node F 711, and node C 705 have copies of the block (i.e., block seven of "volume_X").

Note that node C 705 has a copy of the block because of its activity as a proxy to node E and node F. In the below example, node B 703 tries to write over the block. Note that node B 703 does not request data, because it's about to overwrite whatever is currently in the block. Furthermore node B 703 need not have stored a local copy of the block in order to overwrite it. Node B 703 first connects to its parent, node A 701. The connect message exchange will not be described, as it is believed to be readily apparent from the above examples. Node B 703 may overwrite the block using, for example, the following message exchange.

1. Node B 703 sends an IO_REQUEST to node A 701.

OPCODE=PUT

VOLUME_ID=32002

BLOCK_NUM=7

PERMISSIONS=WRITE_PERMS

DATA=xxxx

2. Node A 701 receives the IO_REQUEST, and knows it has given out a conflicting copy to node C 705, so it sends an INVALIDATE. Note that the block is not actually updated on node A 701, even though node B 703 has provided the new data, until the invalidation process is complete.

VOLUME_ID=32002

BLOCK_NUM=7

PERMISSIONS=NO_PERMS

3. Node C 705 receives the INVALIDATE, and knows that it in turn has given out copies to both node E 709 and node F 711. It therefore sends out INVALIDATE messages to both of them.

VOLUME_ID=26924852

BLOCK_NUM=7

PERMISSIONS=NO_PERMS

4. Node E 709 receives the INVALIDATE message, deletes its local copy of the block, and replies with an OK_REPLY. Note that no volume ID or block number is provided, and node C 705 determines this context based on the header ID contained in the reply.

5. Similar to Node E 709, Node F 711 also receives the INVALIDATE message, deletes its local copy of the block and replies with an OK_REPLY.

6. Node C 705 receives both of the replies from node E 709 and node F 711, and sends its own OK_REPLY to node A 701. Unlike node E and node F, node C 705 fills in the optional parameters of the OK_REPLY in response to the INVALIDATE message to identify the volume and block to which the response pertains. The inclusion of these optimal parameters sent by a node in response to an INVALIDATE is optional. When these parameters are included, it facilitates recognition by the node that issued the INVALIDATE, as the response will specifically identify the volume and block to which it relates. However, as the node that issued the INVALIDATE will have the ability to determine which volume and block the response relates to from the context, the optional parameters are not essential. Thus, bandwidth over the network can be reduced by not including these optional parameters in a response, and relying on the node that issued the INVALIDATE to perform some processing to determine which volume and block to which the response relates.

VOLUME_ID=32002

BLOCK_NUM=7

7. Node A 701 receives the OK_REPLY from node C 705. Invalidation is now complete, leaving no conflicting copies of the block. As a result, node A 701 can update its copy of the block and respond with an OK_REPLY to node B 703.

VOLUME_ID=32002

BLOCK_NUM=7

TTL=1200 seconds

HB_TTL=30 seconds

EXAMPLE FOUR

In a fourth example, an asynchronous write is described. In this example, node D 707 desires to write to the same block (i.e., block seven of volume_id 32002). Again, the CONNECT message between node D 707 and node B 703 will be skipped, as it is believed to be clear from the previous examples. Also, it will be assumed that node B 703 passed on to node D 707 the same volume ID that it received from node A 701 (unlike node C, which replaced the volume ID with a different one; both possibilities are permitted).

1. Node D 707 sends an IO_REQUEST to node B 703.

OPCODE=GET

VOLUME_ID=32002

BLOCK_NUM=7

PERMISSIONS=WRITE_PERMS

2. Node B 703 receives node D's IO_REQUEST and forwards it to node A 701. Node A 701 realizes that it has given a copy of the block to node C 705 with conflicting permissions (i.e., read permissions). Thus, Node A 701 invalidates the copies given out using the same invalidation technique described above. The invalidation message exchange will not be described as it is believed to be apparent from the previous examples. Eventually, node A 701 replies to node B 703 with an OK_REPLY, granting write permissions to node B 703, and node B 703 replies to node D 707 with the following OK_REPLY.

VOLUME_ID=32002

BLOCK_NUM=7

PERMISSIONS=WRITE_PERMS

TTL=1198 seconds

HB_TTL=30 seconds

3. Node D 707 receives the OK_REPLY from node 703 updates its copy of the block. Because no other valid copies of the block exits, node D 707 need not immediately forward the updated block to the root node, node A 701. No further protocol activity occurs at this time.

4. Time passes.

5. Eventually, node D's sync daemon runs and node D 707 ensures that the block it wrote earlier goes all the way to the volume root. It also decides that it is not likely to need the block again any time soon, so it voluntarily gives up its write permissions to the block in the same IO_REQUEST it uses to flush it.

OPCODE=FLUSH

VOLUME_ID=32002

BLOCK_NUM=7

PERMISSIONS=NO_PERMS

DATA=yyyy

6. Node B 703 receives the IO_REQUEST from node D 707. While it notes that D has given up its copy of the block, node B 703, in its role as proxy, decides to keep a copy only for reading and its IO_REQUEST to node A 701 reflects this decision.

OPCODE=FLUSH

VOLUME_ID=32002

BLOCK_NUM=7

PERMISSIONS=READ_PERMS

DATA=yyyy

6. Node B 703 receives an OK_REPLY from node A 701 and node D 707 consequently receives an OK_REPLY from node B 703.

Having thus described several examples of message and data exchanges using the above described communication protocol, it should be apparent that numerous other types of message exchanges may be used. For example, as described above, FORWARD messages may be used when performing semi-synchronous writes. Additionally, flags such as IS_PROXY or IS_ROOT may be used in response to CONNECT messages, as described above.

Error Recovery

Heartbeats and global time-to-live (TTL) messages may be used to detect node failures. In one embodiment of the invention, each node has a global TTL for each node from which it has received a block. If the global TTL expires, all blocks obtained from that node enter into an indeterminate state from which they must be revalidated before being used. Revalidation of a block will be described later in greater detail. To prevent the global TTL of a node's blocks from expiring, the node may send a HEARTBEAT message to the parent node from which those blocks were received. The parent node may respond with a HB_TTL message to refresh the global TTL of the node. Failure to receive HEARTBEAT messages from a node or failure to receive HB_TTL parameters from a node can indicate a failure of the node that was expected to send these messages.

When a node fails, the nodes below it in the hierarchy will no longer receive HB_TTL responses to HEARTBEAT messages, and the nodes above it in the hierarchy will no longer receive HEARTBEAT messages from the node, such that the nodes above and below can detect the failure. In accordance with one embodiment of the invention, the parent of the failed node reclaims all permissions (which the parent node is already aware of) to blocks owned by the failed node, and freezes them during the recovery process. That is, all IO_REQUEST and INVALIDATE messages to the frozen blocks will be rejected by the parent node with a status of IN_RECOVERY. Each child node of the failed node in the hierarchy attempts to reconnect to another node in the hierarchy. This can be done in any of numerous ways, as the present invention is not limited to any particular technique.

In accordance with one illustrative embodiment of the present invention, the child nodes seek to reconnect to their prior grandparent node, i.e., the parent node of the failed parent node. This can be done by the child nodes of the failed node issuing special recovery messages. As the parent of the failed node will realize the failure, it can respond to the recovery messages by creating a direct connection between the former grandparent and child nodes of the failed node. Each child node can then revalidate all of the permissions that it previously held by sending recovery messages to its new parent, specifying the permissions it previously held before the failure. All RECOVERY and INVALIDATE messages involved in revalidation carry the RECOVERY_OP flag. Once revalidation of the blocks is completed, the blocks may be unfrozen.

As discussed above in connection with FIG. 5, one embodiment of the invention is directed to employing multiple root hosts, which provides fault tolerance in the event of a failure of a root node. When a root node fails, metadata about the blocks that have been exported to its child nodes may be lost. If this metadata cannot be recovered from the failed root node, the metadata can be recovered from the child nodes of the failed root node. For example, to determine which blocks of a logical volume had been exported by the failed root node, and to identify the child nodes to which these blocks were exported, the metadata of each child node may be examined to determine which blocks were received from the failed root node. This metadata can then be passed to the new root node for these child nodes.

Illustrative Modular Implementation

As should be appreciated from the foregoing, in a distributed computer system in accordance with various aspects of the present invention, each node in the computer system can serve one of several roles. First, at least one node in the system will be a root node, which will have the capability of exporting a storage volume to other nodes in the system. Second, some of the nodes (e.g., nodes D 707, E 709 and F 711 in FIG. 7) will be client nodes, which access local copies of the exported volume but do not export the volume to other nodes in the system. Finally, the nodes within the middle of the hierarchy can be referred to as proxies. Proxies perform a server function in that they assist in making an exported volume available to other nodes in the computer system (e.g., node B 703 in FIG. 7 exports a shared volume to node D 707). In some embodiments of the present invention discussed below, a proxy node may serve only this server function, and provide no ability to access the volume itself. Alternatively, some proxies may perform not only the server function in making the shared volume available to other nodes in the system, but may also perform a client function, in that the proxy itself may be capable of accessing the shared volume.

Thus, the functionality performed by a node in dealing with nodes below it in the hierarchy for distributing a shared volume and maintaining consistency can be implemented in a server module, which can be found in the root node and each proxy node. Similarly, the functionality for accessing a shared volume that has been exported from a higher level can be performed via a client module. By implementing these functionalities in modules, the functionality for communicating according to various aspects of the present invention can be compartmentalized, enabling easy distribution and scalability.

Finally, for any node that seeks to provide access to the shared volume locally, a local access module can be provided that communicates with the local operating system to enable such local access. When local access is not desired (e.g., for a proxy that does not enable local access), the modules that implement the communication protocol in accordance with various embodiments of the present invention need not have any communication interface with the local operating system).

Figure 8:
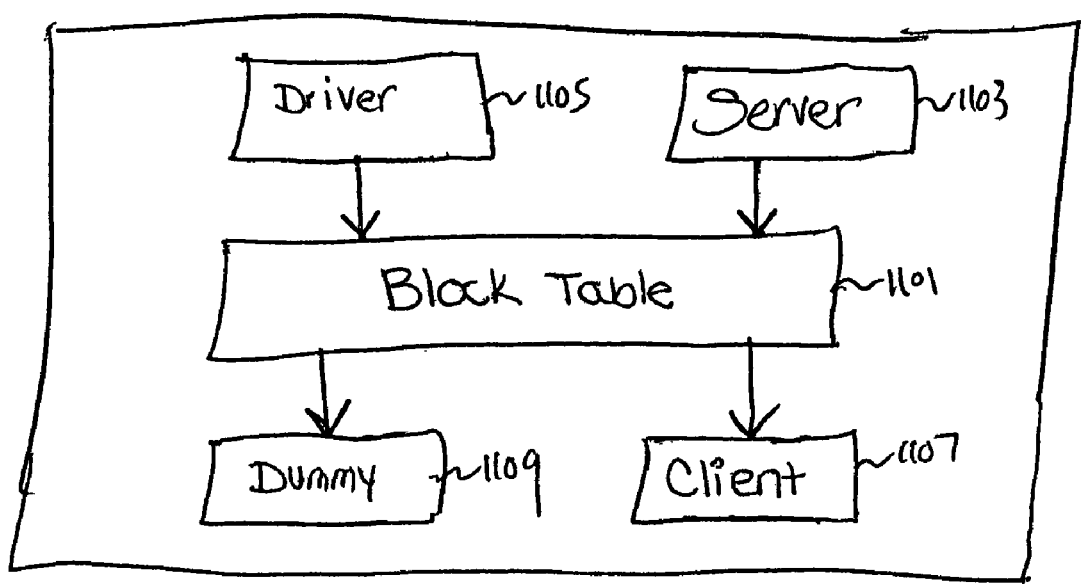
FIG. 8 is a block diagram of an architecture for implementing nodes in a hierarchical distributed computer system in accordance with one embodiment of the present invention.

A block diagram of one illustrative implementation of modules (also referred to herein as controllers) that can be implemented on a node to implement the aspects of the present invention described herein is shown in FIG. 8. It should be appreciated that the present invention is not limited to this or any other particular implementation, as this implementation is provided merely for illustrative purposes.

Block Table 1101 includes a database identifying each block stored locally and each block passed on to other nodes, as well as the permissions for those blocks. Driver 1105 intercepts all local accesses to any of the volumes stored in the Block Table 1101. That is, any accesses to blocks of the volume stored at the node are processed by Driver 1105. Driver 1105 acts as an adaptation layer between the disk driver of the node's operating system and the interface provided by the Block Table.

Server module 1103 is a module that interfaces with nodes below it in the hierarchy and is responsible, for example, for handling protocol communications such as CONNECT and IO_REQUEST from nodes below it in the hierarchy. Server module 1103 is also responsible for issuing INVALIDATE requests to child nodes to maintain consistency. Thus, Server module 1103 maintains, for each block provided to a child node, the connection identifier for the child node, the permissions that were given for the block, and whether the block is currently frozen while waiting for a child node to initiate recovery and revalidation. It should be noted that if a node is a leaf node (i.e., if it has no child nodes) it is not necessary that the node include or use the Server module 1103.

Client module 1107 is a module which is responsible for the exchange of protocol messages between the local node and its parent node. Client 1107 is responsible, for example, for sending requests to the local node's parent node, receiving INVALIDATE requests from the parent node, and providing HEARTBEAT messages to maintain the local node's global TTL. It should be noted that if a node is the root for a volume, it may not be necessary to include or use the client module.

Dummy 1109 is a module which is used only on the root node. Like Client module 1107, it is responsible for initiating requests. However, instead of sending network messages, it reads from and writes to a local disk, which is the authoritative copy of the shared volume. Dummy 1109 does not perform invalidation, since the authoritative copy of the volume is not be invalidated.

Cache Implementation

As discussed above, in one embodiment of the present invention, local copies of at least some portions of a shared volume may be stored in association with each of a plurality of nodes in a computer system. While aspects of the present invention are not limited to any particular technique for storing local copies of shared data, one embodiment of the present invention relates to a specific technique for doing so, i.e., the use of a software cache associated with each node. It is believed that the software cache described below provides a number of advantages. This cache implementation may be used in numerous other applications, and is not limited to use with the other aspects of the present invention described herein relating to techniques for sharing a volume of storage in a distributed manner.

In one embodiment of the invention, a software cache is provided for managing locally stored blocks and the metadata of those blocks. In one embodiment, the software cache is programmed to operate like a set associative hardware cache to allow efficient access to blocks of data in the cache. The cache may be divided into groups, based on associativity. For example, a 250 element cache with an associativity of five would have fifty cache groups. FIG. 10 illustrates a simplified example of a cache according to one embodiment of the invention. In the example of FIG. 10, a 2-way set associative cache (i.e., a cache with an associativity of two) with eight cache groups (906a-h) is shown. It should be appreciated that numerous other set associative cache configurations are possible, as aspects of the present invention are not limited to a two-way set associative cache. Furthermore, it should be appreciated that other embodiments of the present invention directed to cache configurations are not limited to the use of a set associative cache, as other suitable cache configurations can be employed.

In one embodiment of the present invention, the cache group in which a block is stored is determined by a hashing function. For example, in one embodiment of the present invention, the hashing function is a simple modulo function based upon the low order address bits. For example, referring to the illustrative example of FIG. 10 wherein the cache includes eight groups, the hashing function can simply employ the low order three bits of the block address to select one of the available groups 906a-h, and the remainder of the block address bits can be used as a tag to compare against entries in the two sets within the group to determine whether the block address matches (or hits) any entry in the cache. In this respect, it should be appreciated that in a hardware set associative cache, the comparison of the tag bits of the address against the entries within the various sets can be done simultaneously. In accordance with one embodiment of the present invention, this process can be performed serially by the software cache.

As should be appreciated from the foregoing, the entry in which a block is stored is based on the set and the cache group (or slot in FIG. 10) in which the block is stored. For example, a block stored in the first set 902 and in cache group 906c is stored in entry 908c.

In accordance with one embodiment of the present invention, an empty cache entry is designated by the use of a special tag value which will not match any valid block address.

Any suitable replacement technique can be used to determine which cache entry is to be replaced by a new entry. In accordance with one embodiment of the present invention, a least recently used (LRU) technique is employed, although others are possible.

In accordance with one embodiment of the present invention, a cache arrangement including two or more caches is employed, and includes an interface to enable the two or more caches to be used together. In accordance with one embodiment of the present invention, the caches can conceptually be considered to be arranged in a stacked configuration, with a hierarchy defined in terms of access to the cache stack. In accordance with one embodiment of the present invention, the cache at one end of the stack (e.g., the top of the stack) is the one accessed initially. If a hit occurs in the top cache, the access is simply serviced by the top cache in the stack. However, if an access request misses the top cache in the stack, the next cache down in the hierarchy is examined to see whether the desired block is located within that cache. This process continues, so that a miss of the cache arrangement occurs only if a desired block is not found within any of the caches in the stack.

The use of multiple different caches that are interrelated can provide a number of advantages, as each of the caches can differ in certain respects. For example, one of the caches (e.g., the top cache) can be stored using a particularly fast storage resource (e.g., memory) whereas other caches lower in the hierarchy can be implemented using less expensive storage resources (e.g., disks), although the present invention is not limited in this respect. Alternatively, as discussed in more detail below, different hashing algorithms can be employed for the various caches within the stack to increase the likelihood of a hit occurring in the cache stack.

In accordance with one embodiment of the present invention, the caches in the stack are arranged in a hierarchy wherein blocks can be promoted up through the cache stack and demoted down through the cache stack depending upon the replacement algorithm employed. In this respect, in accordance with this embodiment of the present invention, if an access request to a block misses in the top cache but hits in a lower level cache within the stack, the block on which the hit occurs is promoted to the top cache, so that additional follow up accesses to the block will be handled most efficiently from the first cache in the stack. Conversely, when a block is replaced from the top cache in the stack (again using any suitable replacement algorithm, such as an LRU algorithm), the block is demoted to the next lowest level in the cache. This can cause a domino effect wherein each cache in the stack inserts a block into the cache below it in the stack, causing the lower cache to replace one of its blocks, so that blocks are replaced from one level in the stack to the next, until a block is pushed out of the lowest cache in the stack.

In accordance with one embodiment of the present invention, blocks replaced out of the lowest cache in the stack are temporarily stored in a resource referred to herein as a victim repository. In accordance with one embodiment of the present invention, the cache stack will routinely clean up all of the entries that have been discarded into the victim repository, for example by going through the steps of the protocol discussed above to remove the entry from the local copy of the node. The use of the victim repository is advantageous in that it enables the rest of the cache arrangement to avoid pre-allocation penalties of the type experienced in hardware caches. In this respect, a hardware cache includes a limited resource, so that before a new entry can be added to the cache, space for it must be pre-allocated by removing the entry to be replaced, and storing it safely elsewhere. In accordance with one embodiment of the present invention, the use of software resources to implement the cache arrangement can be capitalized upon by allocating some amount of additional storage to the cache arrangement beyond what it actually requires to implement the caches in the arrangement. This additional storage space can be used to form the victim repository, so that the pre-allocation step of storing a block being replaced from the cache need not be done prior to allowing a new block to be written to the cache stack, which can provide performance improvements.

It should be appreciated that monitoring the victim repository and storing to other storage resources the blocks that are disposed therein ensures that the software cache is not be constrained and does not consume storage resources well beyond those allocated to the cache. Although the use of the victim repository provides the advantages discussed above, it should be appreciated that the aspects of the present invention relating to a novel cache arrangement are not limited in this respect, such that the victim repository can optionally not be employed.

The aspect of the present invention described herein wherein blocks are automatically promoted and demoted through the cache levels in the stack is advantageous, in that the applications that access the stack need not manage the movement of blocks of information from one cache in the stack to the other. Although the automatic promotion and demotion of blocks through the various cache levels is advantageous for the reasons discussed above, it should be appreciated that the present invention is not limited in this respect, and that some embodiments do not employ automatic promotion and demotion. Similarly, although the cache arrangement of a plurality of caches is described herein in one embodiment as constituting a hierarchical stack, it should be appreciated that aspects of the present invention are not limited in this respect, and can employ cache arrangements having other types of configurations. Similarly, although the embodiments of the present invention described herein refer to the units of data stored within the cache as being blocks, the present invention is not limited in this respect, as various other units of data can be employed and managed within the cache arrangement.

In accordance with another embodiment of the present invention, the cache arrangement can be modified dynamically, such that caches can be added to and removed from the stack dynamically. As used herein, reference to the cache arrangement being modified dynamically refers to configuration changes being performed without requiring reconfiguration of application programs that access the cache arrangement. It should be appreciated that in the embodiment of the present invention wherein the cache arrangement is organized as a cache stack, the ability to dynamically reconfigure the cache arrangement enables the cache stack to have any selected depth that can be modified dynamically.

In accordance with one embodiment of the present invention, each cache in the arrangement can store statistics of information relating to its performance (e.g., hits, misses, promotions, demotions, etc.). By examining such information, a system administrator can make informed decisions about the performance of the cache arrangement, and make dynamic configuration changes that can assist in the performance thereof. In this respect, it should be appreciated that it often may be difficult to anticipate the specific requirements of a particular environment, such that an initial configuration for a cache arrangement that appeared to be desirable may not be optimal, such that the ability to dynamically reconfigure the cache arrangement can provide significant advantages. As mentioned above, modifications to the configuration of the cache arrangement can include adding or deleting caches, changing the properties (e.g., the hashing function) of one or more caches, changing the nature of the storage medium (e.g., between memory and disk) used to store one or more of the caches, and/or any other desired changes.

As mentioned above, in one embodiment of the present invention, different caches in the cache arrangement may employ different hashing functions. The use of two or more caches using different hashing functions diminishes the likelihood of repeated contentions in the cache arrangement that can result from the nature of the data accesses for a particular application. In this respect, if an application has a data access pattern that, due to the hashing function of one of the caches, causes repeated contentions for a relatively small number of groups or entries within that cache, the provision in the cache arrangement of at least one other cache having a different hashing function diminishes the likelihood that contentions will also exist in that other cache, thereby diminishing the likelihood of repeated contentions within the cache arrangement overall. Although the use of different hashing functions for caches within the cache arrangement provides the advantages discussed above, it should be appreciated that not all embodiments of the present invention relating to novel cache arrangements are limited in this respect.

In accordance with one embodiment of the present invention relating to the use of set associative caches, each cache in the stack is given a fixed size, such that by modifying the number of groups in a particular cache, the number of sets is correspondingly changed, and the hashing function is also changed.

When a cache is used as the local storage medium in connection with the above-described embodiments of the present invention relating to a distributed node hierarchy, techniques can be employed to minimize the amount of storage used at each local node. For example, when a node receives a message from another node, it may allocate a memory buffer to store parameters or other data associated with the message. If the buffer contains data to be cached, instead of copying data to be cached into a cache slot, a pointer (e.g., a memory address) to the buffer having the data can be stored in the cache slot. Thus, the buffered block of data does not need to be copied into the cache and the time and resources required for such memory copies may be conserved.

If the data is stored in a memory buffer instead of a cache slot, the offset of the data in the memory buffer may also be stored. This offset can be stored as part of the cache tag for the slot storing the pointer to the memory buffer. For example, the tag can be multiplied by the associativity of the cache and the buffer offset may be added to the result.

It should be appreciated that the aspects of the cache arrangement described above can be employed in numerous environments where it is desirable to cache information, such that these aspects of the present invention are not limited to use in a system for distributing storage volumes, as they can be used in numerous other applications.

The aspects of the present invention described above relating to a cache arrangement can be implemented in any of numerous ways, as the present invention is not limited to any particular implementation technique. For example, the storage media used to store the data within the cache can be any storage media available to the computer (e.g., a node), such as memory or a hard disk. Similarly, the control for the cache arrangement can be implemented via at least one processor program to perform the control functions described above. However, the present invention is not limited to any particular implementation technique, as numerous implementation techniques are possible.

Use of Distributed Node Techniques as a Storage Performance Accelerator

Figure 11B:
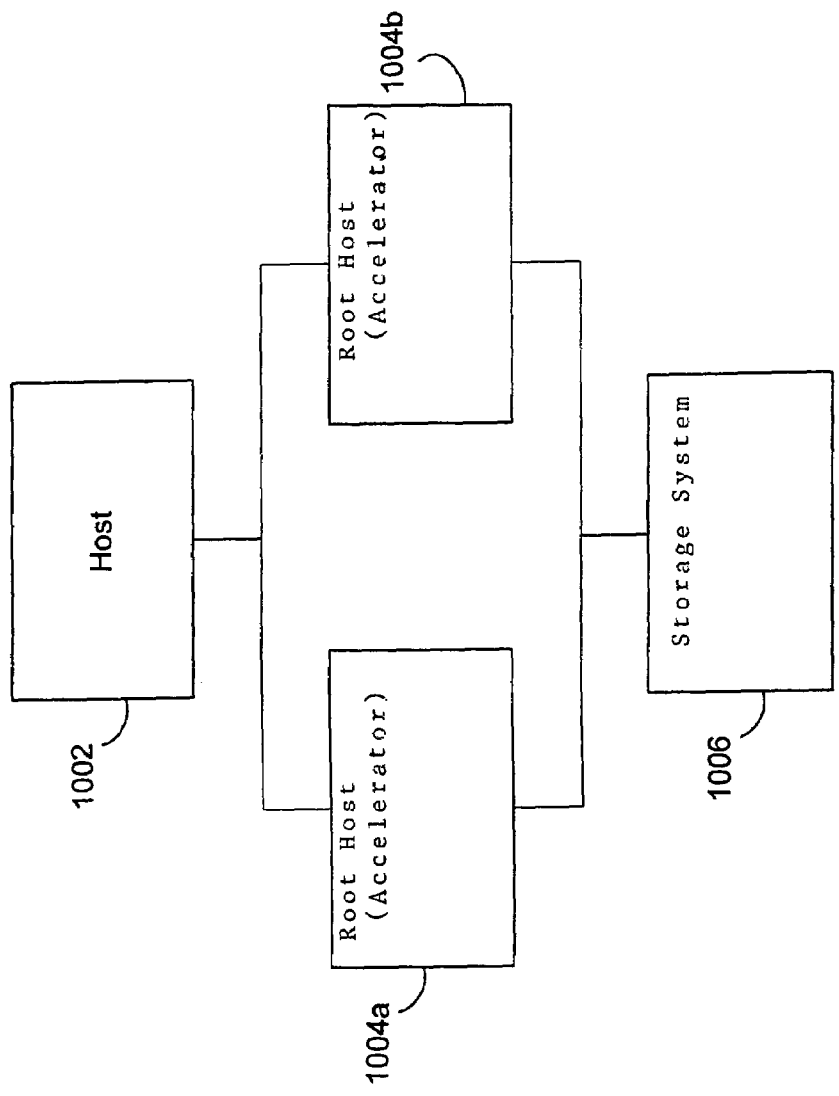
FIGS. 11A and 11B are block diagrams of a configuration of a computer system employing performance accelerating in accordance with embodiments of the invention.
Figure 11A:
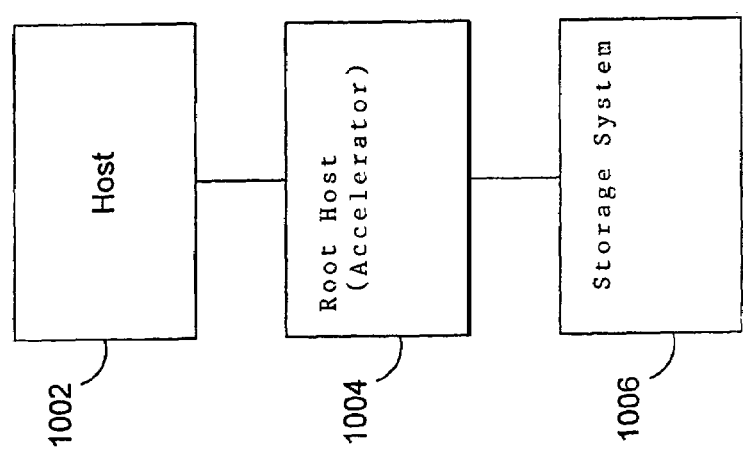

One application for the above-described aspects of the present invention wherein a root host exports a storage volume is to use one or more root hosts in an intermediate position between a host computer and a storage system to serve as a storage system performance accelerator. This aspect of the present invention is illustrated in FIGS. 11A-B. Each of these figures illustrates a host computer 1002 and a storage system 1006 that stores data for the host computer 1002.

In the embodiment illustrated in FIG. 11A, a root host 1004 is disposed between the host computer 1002 and the storage system 1006, and exports volumes of storage made available by the storage system 1006 to the host computer 1002, using techniques such as those described above. In addition to exporting volumes of storage to the host computer 1002, the root host 1004 also stores a local copy in the manner described above (e.g., by employing a software cache or any other suitable technique). It should be appreciated that when the host computer 1002 seeks to access a block of storage that is stored locally within the root host

1004, the access time for performing such an access may be less than if the host computer 1002 needed to access the storage volume directly from the storage system 1006, particularly if the block of storage being accessed is not stored within the cache (e.g., cache 11 in FIG. 1) in the storage system 1006. Thus, in accordance with the embodiment of the present invention illustrated in FIG. 11, the root host 1004 can be provided to serve as a performance accelerator for the storage system 1006.

It should be appreciated that in the embodiment of FIG. 11, the local storage provided in the root host 1004 can serve to accelerate the performance of the storage system 1006 in a manner that can be conceptually analogized to providing the storage system 1006 with a larger effective cache size. It should be appreciated that the local storage within the root host can be provided in a manner that may be more cost effective than cache within the storage system 1006. Furthermore, as illustrated in FIG. 11B, two or more root hosts 1004a-b can be provided in parallel to provide an even larger effective cache size, which can greatly exceed the finite cache capability of the storage system 1006. The parallel root hosts 1004a-b that act as storage accelerators can be arranged in any manner, and can include any number of root hosts to serve as accelerators. For example, the volumes of storage to be accessed by the host 1002 can be striped across the multiple root host accelerators so that some blocks of storage may be stored in one root host accelerator, while other blocks will be stored in the other. For example, referring to the configuration of FIG. 11B wherein two root host accelerators 1004a-b are employed, even blocks of storage can be provided in the root host 1004a and odd blocks can be provided in the root host 1004b. Of course, numerous other techniques can be employed for distributing the volumes of storage to be accessed by the host 1002 across two or more root host accelerators, as this aspect of the present invention is not limited to any particular technique.

Untrusted Intermediaries

In accordance with one embodiment of the present invention, it is desirable to enable a distributed system of shared volumes to be implemented on a computer system that includes not only trusted nodes, but also some untrusted nodes. In this respect, it should be appreciated that with the advent of networked computer systems, it has become increasingly more common to encounter computer systems wherein all of the participants in the network (e.g., the host computers and storage devices) are not owned by a common enterprise. As such, security issues are raised wherein it may be important to protect data owned by one enterprise from untrusted hosts that may belong to another enterprise, to ensure that the untrusted hosts cannot write (and thereby corrupt) data, or read data to which access may be restrict.

Figure 9:
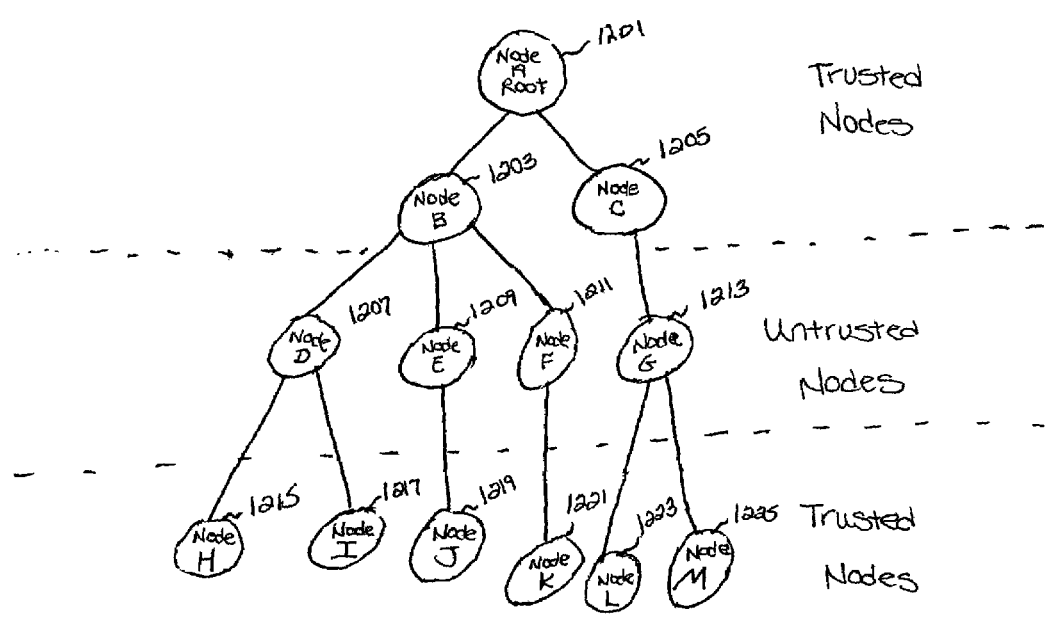
FIG. 9 is a block diagram illustrating, as a node hierarchy, an embodiment of the present invention that employs untrusted nodes.

Despite the foregoing concerns, in accordance with one embodiment of the present invention, it is desirable to utilize untrusted nodes to facilitate development of a distributed system. Thus, in accordance with one embodiment of the present invention, untrusted nodes can act as proxies which can locally store and transmit data through the hierarchy, but untrusted nodes cannot read or modify the data. An example of such a configuration is illustrated in FIG. 9. It should be appreciated that by utilizing untrusted hosts, the load on trusted hosts and the network can be reduced, and greater flexibility can be provided for system configuration (e.g., the intermediary nodes can be contracted out to untrusted third parties).

It should be appreciated that the aspects of the present invention described herein relating to the ability to make use of untrusted intermediaries is not limited to use with the distributed shared storage volume aspects of the present invention, and can be used in numerous other types of distributed applications. The aspects of the present invention relating to use of untrusted intermediaries can be employed in any large scale distributed system wherein numerous components work together with additional components sitting in between and it is desirable to prevent the components sitting in between from disturbing the operation of the system.

Conversely, while one embodiment of the present invention makes use of untrusted intermediaries to store and forward data to achieve the benefits provided thereby, it should be appreciated that the present invention is not limited in this respect, and that the other aspects of the present invention described herein can alternatively be implemented in computer systems that include only trusted participants.

In accordance with one embodiment of the present invention, security techniques are employed so that untrusted nodes can store and pass along data, but cannot read or write it. This can be done in any of numerous ways, as the present invention is not limited to any particular security technique. In accordance with one embodiment of the present invention, untrusted nodes are available to process and pass along not only reads of the shared data, but also writes.

In one embodiment of the invention, three encryption keys are associated with each volume. A symmetric key is used to encrypt the block data and a public/private key pair is used to encrypt checksums of the data. Only trusted nodes have access to the symmetric and private keys. When a block is written by a node, the node uses the symmetric key of the volume to encrypt the block. A digest or checksum is derived from the encrypted block and the block's location in the volume. The checksum is then encrypted with the volume's private key. The encrypted data is sent to the receiving node along with the encrypted checksum. To validate the integrity of the received block of data, a receiving node may use the volume's public key to decrypt the checksum. A new checksum is computed based on the encrypted block of data and compared to the received and decrypted checksum. If the two checksums do not match, then the data is not valid and the write request is rejected.

Because only the public key is required to decrypt the checksum, even an untrusted node has the capability to receive a write request, determine whether the block of data is valid, and if so, to store the block of data locally. However, the untrusted node will not have access to the symmetric key, and therefore, will not be able to view the content of the data itself.

In accordance with one embodiment of the present invention, a technique is also employed to ensure that writes can only complete successfully if they have been transmitted to a trusted node, such that it can be verified that a write is not stuck in an untrusted node, but has made it to a trusted storage location. Furthermore, such a technique can also ensure that writes cannot be initiated by an untrusted node, such that an untrusted node can only pass along writes initiated from a trusted node, but cannot initiate the write itself.

This additional level of write protection can be accomplished in any of numerous ways, as the present invention is not limited to any particular technique. In accordance with one illustrative embodiment of the present invention, this level of write protection is provided by using authentication or signing techniques, wherein the node that initiates a write must include an authentication signature that can be validated by a trusted node for the write to complete. The authentication signatures can be distributed to nodes in the system using encryption techniques (such as those discussed above) so that only trusted nodes will receive the authentication signature, thereby preventing an untrusted node from initiating a write request. Furthermore, as an untrusted node will not have the capability of decrypting a write request to determine whether it includes the proper authentication signature, an untrusted node will similarly not have the ability to validate that a write has occurred successfully, such that this validation can only occur when the write has been validated by a trusted node.

In one embodiment of the present invention, yet a further layer of protection is provided to prevent a so-called replay attack by one of the untrusted nodes. A replay attack occurs when an untrusted node intercepts the credentials from a trusted node and attempts to use them to issue a later data request. A replay attack may attempt to use the stolen credentials to issue a later write with different data. Alternatively, and more subtly, a replay attack may also relate to an untrusted node storing an entire write instruction, including the credentials and data, that was validly submitted by a trusted node, and then resending the write request at a later point in time. This type of replay attack is insidious in that the write request is in identical form to a previously submitted write request that was valid. However, because it occurs at a later point in time, if undetected and the write is processed, it may overwrite valid data, as the target location for the write may have been overwritten by a subsequent write from a trusted node.

In accordance with one embodiment of the present invention, a technique employed to prevent replay attacks utilizes a single-use resource as the authentication signature, such that the resource can only be used once to issue a valid write request. Thus, if the authentication signature is later used by an untrusted node in a replay attack, the replay attack will fail. This provides secure write protection in an environment that includes untrusted nodes. In the specific implementation discussed below, the concept of a cookie is employed to provide secure write authentication. However, it should be appreciated that this is merely provided as a one example, as other techniques can alternatively be employed for providing secure writes in an untrusted environment.

In one embodiment of the present invention, writes are secured by providing cookies to trusted nodes. Cookies may come in three varieties: raw, baked, and burnt. A raw cookie may be pseudorandom number generated by the root node, encrypted using the symmetric key and propagated down through the node hierarchy. A node can issue a GET_COOKIES request to receive a batch of cookies. To reduce network traffic caused by nodes continually issuing GET_COOKIES requests, cookies may be provided in response to every write request issued by a node. That is, every time a node issues a write message, for example a PUT or a FLUSH, it receives a new raw cookie in the response.

Possession of a raw cookie gives a node authorization to write a particular unit of data (e.g., single block in one embodiment). When a node wishes to write a block, it decrypts the raw cookie with the symmetric key and then encrypts it using the volume's private key to create a baked cookie, which is passed to another node with the write request message. Thus, a cookie encrypted with the volume's private key is known as a baked cookie. Baking a cookie requires use of the symmetric key and the private key, neither of which is possessed by an untrusted node. When the write request propagates to the volume root, the volume root can then decrypt the cookie with the corresponding public key to determine the raw cookie value. The raw cookie can then be checked to make sure that it has not already been used, thus preventing a write from occurring more than once.

To complete a write operation, the node that initiated the write must receive a response that the write completed to a trusted node. This can be done with the use of a burnt cookie. A burnt cookie is created by encrypting the baked cookie again with the volume's private key. Because untrusted nodes do not have access to the private key, they are incapable of creating a burnt cookie to send to a node issuing a write request to complete the write operation, so untrusted nodes must forward all write requests to a trusted node so that a burnt cookie may be provided back to the write requesting node. Because creation of a burnt cookie involves encrypting a cookie twice with the volume's private key, an encryption technique should be used that is not weakened by repetition. Many such algorithms are known, and any suitable algorithm may be employed The above-described embodiments of the present invention can be implemented in any of numerous ways. For example, the above-discussed functionality can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for use in a computer system including a plurality of host computers including a root host computer and at least one child host computer, the root host computer having a volume of storage available to it that is stored on at least one non-volatile storage device, the method comprising an act of:

(A) exporting at least a portion of the volume of storage from the root host computer to the at least one child host computer so that the at least one child host computer and the root host computer share access to the volume of storage.

2. The method of claim 1, wherein the act (A) includes an act of exporting the at least a portion of the volume of storage to a plurality of child host computers so that the plurality of child host computers and the root host computer share access to the volume of storage.

3. The method of claim 1, further comprising an act of:

(B) exporting the at least a portion of the volume of storage from the at least one child host computer to at least one grandchild host computer of the plurality of host computers so that the at least one child host computer, the at least one grandchild host computer and the root host computer share access to the volume of storage, wherein the at least one child host computer has access to the volume of storage through the root host computer, and wherein the at least one grandchild host computer has access to the volume of storage through the at least one child host computer to create a logical hierarchy of host computers that share access to the volume of storage.

4. The method of claim 1, wherein the at least one non-volatile storage device is provided on the root host computer.

5. The method of claim 1, wherein the computer system further comprises at least one storage system that includes the non-volatile storage device and makes the volume of storage available to the root host computer.

6. The method of claim 1, further comprising an act of caching a local copy of the at least a portion of the volume of storage on the child host computer.

7. The method of claim 3, further comprising acts of:
caching a first local copy of the at least a portion of the volume of storage on the at least one child host computer; and
caching a second local copy of the at least a portion of the volume of storage on the at least one grandchild host computer.

8. The method of claim 3, wherein the at least one child host computer comprises a plurality of child host computers, and wherein at least one of the plurality of child host computers is untrusted by the root host computer.

9. The method of claim 3, wherein the at least one child host computer has access to the volume of storage through the root host computer and the at least one grandchild host computer has access to the volume of storage through the at least one child host computer to create a logical hierarchy of host computers that share access to the shared volume, the logical hierarchy have at least a root level, a child level and a grandchild level, and wherein the method further includes an act of:

(C) exporting the at least a portion of the volume of storage to at least one of the plurality of host computers in the logical hierarchy that is untrusted by the root host computer.

10. The method of claim 6, wherein the act of caching a local copy of the at least a portion of the volume of storage on the child host computer includes caching the at least a portion of the volume of storage in a set associative cache having at least two separately indexed portions.

11. The method of claim 5, wherein the volume of storage is a logical volume made available from the at least one storage system to the root host computer.

12. The method of claim 11, wherein the at least one non-volatile storage device is a disk drive in the at least one storage system.

13. The method of claim 5, wherein the volume of storage is a logical volume made available from the storage system to the root host computer, and wherein the at least a portion of the volume of storage is a block of the logical volume.

14. The method of claim 3, wherein the computer system further comprises a network that interconnects the root host computer, the at least one child host computer and the at least one grandchild host computer.

15. The method of claim 3, wherein the at least one child host computer comprises a plurality of child host computers, wherein the at least one grandchild host computer comprises a plurality of grandchild host computers, and wherein the method further comprises an act of:
storing a local copy of at least portions of the volume of storage for each of the plurality of child host computers and the plurality of grandchild host computers.

16. The method of claim 15, further comprising an act of:
in response to a write request from one of the plurality of child host computers and the plurality of grandchild host computers to write to a first portion of the volume of storage, invalidating any local copies of the first portion of the volume of storage associated with the other child and grandchild host computers prior to authorizing the write request to proceed.

17. The method of claim 3, wherein the at least one child host computer comprises a plurality of child host computers, wherein the at least one grandchild host computer comprises a plurality of grandchild host computers, wherein each of the plurality of child and grandchild host computers comprises a node in a logical hierarchy for distributing the shared volume of storage throughout the computer system, and wherein the method further comprises an act of:
providing each node in the logical hierarchy with information that enables it to participate in the hierarchy, wherein the information is limited to information relating only to adjacent nodes in the hierarchy.

18. The method of claim 1, further comprising an act of storing a local copy of the at least a portion of the volume of storage for the at least one child host computer.

19. The method of claim 3, further comprising acts of:
storing a first local copy of the at least a portion of the volume of storage for the at least one child host computer; and
storing a second local copy of the at least a portion of the volume of storage for the at least one grandchild host computer.

20. The method of claim 3, wherein the computer system has a physical configuration, and wherein the logical hierarchy is independent of the physical configuration of the computer system.

21. The method of claim 3, wherein the at least one child host computer comprises a plurality of child host computers, wherein the at least one grandchild host computer comprises a plurality of grandchild host computers, wherein each of the plurality of child and grandchild host computers comprises a node in a logical hierarchy for distributing the shared volume of storage throughout the computer system, and wherein the method further comprises acts of:
storing a local copy of the volume of storage for each of the nodes in the hierarchy, each local copy comprising a copy of at least a portion of the volume of storage, wherein the at least a portion of the volume may differ between the nodes in the hierarchy; and storing, in association with each local copy, metadata describing the at least a portion of the volume of storage included in the local copy and permissions information defining access authorization for the associated node to the at least a portion of the volume of storage stored in the local copy.

22. The method of claim 21, further comprising an act of storing, for at least one first node in the hierarchy, permissions information defining access authorization for at least one second node in the hierarchy that is descendant from the at least one first node in the hierarchy.

23. The method of claim 21, further comprising an act of storing, for at least one first node in the hierarchy, permissions information defining access authorization for each of the nodes in the hierarchy that is descendant from the at least one first node.

24. The method of claim 21, wherein each of the nodes in the hierarchy has a parent node, wherein the permissions information is granted from a parent node to its descendant nodes in the hierarchy, and wherein the method further comprises acts of:

when a failed node in the hierarchy fails, recovering from the failure by reconnecting direct descendant nodes of the failed node to the parent node of the failed node; and reestablishing the permission information for each of the direct descendant nodes of the failed node from the parent node of the failed node.

25. A method for use in a computer system including a plurality of host computers and at least one storage system, the plurality of host computers including a root host computer and at least one child host computer, the at least one storage system making a volume of storage available to the root host computer, the at least one storage system having at least storage device on which the volume of storage is stored, the method comprising an act of:

(A) exporting at least a portion of the volume of storage from the root host computer to the at least one child host computer so that the at least one child host computer and the root host computer share access to the volume of storage.

26. The method of claim 25, wherein the act (A) includes an act of exporting the at least a portion of the volume of storage to a plurality of child host computers so that the plurality of child host computers and the root host computer share access to the volume of storage.

27. The method of claim 25, further comprising an act of:

(B) exporting the at least a portion of the volume of storage from the at least one child host computer to at least one grandchild host computer of the plurality of host computers so that the at least one child host computer, the at least one grandchild host computer and the root host computer share access to the volume of storage, wherein the at least one child host computer has access to the volume of storage through the root host computer, and wherein the at least one grandchild host computer has access to the volume of storage through the at least one child host computer to create a logical hierarchy of host computers that share access to the volume of storage.

28. The method of claim 27, further comprising acts of:

storing a first local copy of the at least a portion of the volume of storage for the at least one child host computer; and storing a second local copy of the at least a portion of the volume of storage for the at least one grandchild host computer.

29. The method of claim 27, wherein the computer system has a physical configuration, and wherein the logical hierarchy is independent of the physical configuration of the computer system.

30. The method of claim 25, further comprising an act of caching a local copy of the at least a portion of the volume of storage on the child host computer.

31. The method of claim 27, further comprising acts of:

caching a first local copy of the at least a portion of the volume of storage on the at least one child host computer; and caching a second local copy of the at least a portion of the volume of storage on the at least one grandchild host computer.

32. The method of claim 25, wherein the at least one child host computer comprises a plurality of child host computers, and wherein at least one of the plurality of child host computers is untrusted by the root host computer.

33. The method of claim 27, wherein the at least one child host computer has access to the volume of storage through the root host computer and the at least one grandchild host computer has access to the volume of storage through the at least one child host computer to create a logical hierarchy of host computers that share access to the shared volume, the logical hierarchy have at least a root level, a child level and a grandchild level, and wherein the method further includes an act of:

(D) exporting the at least a portion of the volume of storage to at least one of the plurality of host computers in the logical hierarchy that is untrusted by the root host computer.

34. The method of claim 30, wherein the act of caching a local copy of the at least a portion of the volume of storage on the child host computer includes caching the at least a portion of the volume of storage in a set associative cache having at least two separately indexed portions.

35. The method of claim 25, wherein the volume of storage is a logical volume made available from the at least one storage system to the root host computer.

36. The method of claim 35, wherein the storage system has at least one disk drive that stores the volume of storage.

37. The method of claim 25, wherein the volume of storage is a logical volume made available from the storage system to the root host computer, and wherein the at least a portion of the volume of storage is a block of the logical volume.

38. The method of claim 27, wherein the computer system further comprises a network that interconnects the root host computer, the at least one child host computer and the at least one grandchild host computer.

39. The method of claim 27, wherein the at least one child host computer comprises a plurality of child host computers, wherein the at least one grandchild host computer comprises a plurality of grandchild host computers, and wherein the method further comprises an act of:

storing a local copy of at least portions of the volume of storage for each of the plurality of child host computers and the plurality of grandchild host computers.

40. The method of claim 27, further comprising an act of:

in response to a write request from one of the plurality of child host computers and the plurality of grandchild host computers to write to a first portion of the volume of storage, invalidating any local copies of the first portion of the volume of storage associated with the other child and grandchild host computers prior to authorizing the write request to proceed.

41. The method of claim 27, wherein the at least one child host computer comprises a plurality of child host computers, wherein the at least one grandchild host computer comprises a plurality of grandchild host computers, wherein each of the plurality of child and grandchild host computers comprises a node in a logical hierarchy for distributing the shared volume of storage throughout the computer system, and wherein the method further comprises an act of:
   providing each node in the logical hierarchy with information that enables it to participate in the hierarchy, wherein the information is limited to information relating only to adjacent nodes in the hierarchy.

42. The method of claim 25, further comprising an act of storing a local copy of the at least a portion of the volume of storage for the at least one child host computer.

43. The method of claim 27, wherein the at least one child host computer comprises a plurality of child host computers, wherein the at least one grandchild host computer comprises a plurality of grandchild host computers, wherein each of the plurality of child and grandchild host computers comprises a node in a logical hierarchy for distributing the shared volume of storage throughout the computer system, and wherein the method further comprises acts of:
   storing a local copy of the volume of storage for each of the nodes in the hierarchy, each local copy comprising a copy of at least a portion of the volume of storage, wherein the at least a portion of the volume may differ between the nodes in the hierarchy; and
   storing, in association with each local copy, metadata describing the at least a portion of the volume of storage included in the local copy and permissions information defining access authorization for the associated node to the at least a portion of the volume of storage stored in the local copy.

44. The method of claim 43, further comprising an act of storing, for at least one first node in the hierarchy, permissions information defining access authorization for at least one second node in the hierarchy that is descendant from the at least one first node in the hierarchy.

45. The method of claim 43, further comprising an act of storing, for at least one first node in the hierarchy, permissions information defining access authorization for each of the nodes in the hierarchy that is descendant from the at least one first node.

46. The method of claim 43, wherein each of the nodes in the hierarchy has a parent node, wherein the permissions information is granted from a parent node to its descendant nodes in the hierarchy, and wherein the method further comprises acts of:
   when a node in the hierarchy fails, recovering from the failure by reconnecting direct descendant nodes of the failed node to the parent node of the failed node; and
   reestablishing the permission information for each of the direct descendant nodes of the failed node from the parent node of the failed node.

47. A method for use in a computer system including a plurality of host computers including a root host computer, at least one child host computer and at least one grandchild host computer, the root host computer having at least one volume of storage available to it, the method comprising acts of:
   (A) exporting at least a first portion of the volume of storage from the root host computer to the at least one child host computer; and
   (B) exporting at least a second portion of the volume of storage from the child host computer to the at least one grandchild host computer, so that the at least one child host computer, the at least one grandchild host computer and the root host computer share access to the volume of storage.

48. The method of claim 47, wherein the act (A) includes an act of exporting the at least a first portion of the volume of storage to a plurality of child host computers so that the plurality of child host computers, the at least one grandchild host computer and the root host computer share access to the volume of storage.

49. The method of claim 48, wherein the act (B) includes an act of exporting the at least a second portion of the volume of storage to a plurality of grandchild host computers so that the plurality of child host computers, the plurality of grandchild host computers and the root host computer share access to the volume of storage.

50. The method of claim 47, wherein the act (B) includes an act of exporting the at least a second portion of the volume of storage to a plurality of grandchild host computers so that the at least one child host computer, the plurality of grandchild host computers and the root host computer share access to the volume of storage.

51. The method of claim 47, wherein the at least a second portion of the volume of storage is identical to the at least a first portion of the volume of storage.

52. The method of claim 47, wherein the at least a second portion of the volume of storage is a subset of the at least a first portion of the volume of storage.

53. The method of claim 47, further comprising an act of:
   providing the at least one child host computer with access to the volume of storage only through the root host computer, and providing the at least one grandchild host computer with access to the volume of storage only through the at least one child host computer to create a logical hierarchy of host computers that share access to the volume of storage.

54. The method of claim 47, wherein the computer system further comprises at least one storage system that makes the volume of storage available to the root host computer.

55. The method of claim 47, further comprising acts of:
   caching a first local copy of the at least a first portion of the volume of storage on the at least one child host computer; and
   caching a second local copy of the at least a second portion of the volume of storage on the at least one grandchild host computer.

56. The method of claim 53, further comprising an act of:
   exporting at least a portion of the volume of storage to at least one of the plurality of host computers in the logical hierarchy that is untrusted by the root host computer.

57. The method of claim 55, wherein the act of caching a first local copy of the at least a first portion of the volume of storage on the at least one child host computer comprises caching the at least a first portion of the volume of in a set associative cache having at least two separately indexed portions; and
   wherein the act of caching a second local copy of the at least a second portion of the volume of storage on the at least one grandchild host computer comprises caching the at least a second portion of the volume of in a set associative cache having two separately indexed portions.

58. The method of claim 54, wherein the volume of storage is a logical volume made available from the at least one storage system to the root host computer.

59. The method of claim 54, wherein the at least one storage system stores the at least one volume of storage on a disk drive.

60. The method of claim 54, wherein the volume of storage is a logical volume made available from the storage system to the root host computer, and wherein the at least a first portion of the volume of storage is a block of the logical volume.

61. The method of claim 47, wherein the computer system further comprises a network that interconnects the root host computer, the at least one child host computer and the at least one grandchild host computer.

62. The method of claim 47, further comprising acts of:
storing a first local copy of the at least a first portion of the volume of storage for the at least one child host computer; and
storing a second local copy of the at least a second portion of the volume of storage for the at least one grandchild host computer.

63. The method of claim 62, further comprising an act of:
in response to a write request from one of the plurality of child host computers and the plurality of grandchild host computers to write to a specified portion of the volume of storage, invalidating any local copies of the specified portion of the volume of storage associated with the other child and grandchild host computers prior to authorizing the write request to proceed.

64. The method of claim 47, wherein each of the plurality of child and grandchild host computers comprises a node in a logical hierarchy for distributing the shared volume of storage throughout the computer system, and wherein the method further comprises an act of:
providing each node in the logical hierarchy with information that enables it to participate in the hierarchy, wherein the information is limited to information relating only to adjacent nodes in the hierarchy.

65. The method of claim 47, further comprising an act of storing a local copy of the at least a first portion of the volume of storage for the at least one child host computer.

66. The method of claim 47, wherein each of the plurality of child and grandchild host computers comprises a node in a logical hierarchy for distributing the shared volume of storage throughout the computer system, wherein the computer system has a physical configuration, and wherein the logical hierarchy is independent of the physical configuration of the computer system.

67. The method of claim 47, wherein each of the plurality of child and grandchild host computers comprises a node in a logical hierarchy for distributing the shared volume of storage throughout the computer system, and wherein the method further comprises acts of:
storing a local copy of the volume of storage for each of the nodes in the hierarchy, each local copy comprising a copy of at least a portion of the volume of storage, wherein the at least a portion of the volume may differ between the nodes in the hierarchy; and
storing, in association with each local copy, metadata describing the at least a portion of the volume of storage included in the local copy and permissions information defining access authorization for the associated node to the at least a portion of the volume of storage stored in the local copy.

68. The method of claim 67, further comprising an act of storing, for at least one first node in the hierarchy, permissions information defining access authorization for at least one second node in the hierarchy that is descendant from the at least one first node in the hierarchy.

69. The method of claim 67, further comprising an act of storing, for at least one first node in the hierarchy, permissions information defining access authorization for each of the nodes in the hierarchy that is descendant from the at least one first node.

70. The method of claim 67, wherein each of the nodes in the hierarchy has a parent node, wherein the permissions information is granted from a parent node to its descendant nodes in the hierarchy, and wherein the method further comprises acts of:
when a node in the hierarchy fails, recovering from the failure by reconnecting direct descendant nodes of the failed node to the parent node of the failed node; and
reestablishing the permission information for each of the direct descendant nodes of the failed node from the parent node of the failed node.

71. A method for use in a computer system including a plurality of host computers including at least first and second root host computers, a first group of child host computers and a second group of child host computers, the first and second groups of child host computers each comprising at least one child host computer, the first and second root host computers each having a shared volume of storage available to it, the method comprising acts of:
(A) exporting at least a first portion of the shared volume of storage from the first root host computer to the first group of child host computers; and
(B) exporting at least a second portion of the shared volume of storage from the second root host computer to the second group of child host computers, so that the first and second root host computers and the first and second groups of child host computers all share access to the shared volume of storage.

72. The method of claim 71, further including an act of:
(C) in the event of a failure of the first root host computer, exporting the at least a first portion of the shared volume from the second root host computer to the first group of child host computers.

73. The method of claim 71, further comprising an act of:
(D) making the shared volume available to the first and second root host computers from a single copy of the shared volume.

74. The method of claim 71, wherein the computer system includes first and second storage systems, the first storage system storing a first copy of the shared volume and the second storage system storing a second copy of the shared volume, and wherein the method further comprises acts of:
(D) making the first copy of the shared volume available to the first root host computer; and
(E) making the second copy of the shared volume available to the second root host computer.

75. The method of claim 71, wherein the first and second portions of the shared volume are identical.

76. A computer readable medium encoded with a program for execution on a computer system including a plurality of host computers including a first host computer and at least one second host computer, the first host computer having a volume of storage available to it that is stored on at least one non-volatile storage device, the program, when executed, performs a method comprising an act of:
(A) exporting at least a portion of the volume of storage from the first host computer to the at least one second host computer so that the at least one second host computer and the first host computer share access to the volume of storage.

77. The computer readable medium of claim 76, wherein the act (A) includes an act of exporting the at least a portion of the volume of storage to a plurality of second host computers so that the plurality of second host computers and the first host computer share access to the volume of storage.

78. The computer readable medium of claim 76, wherein the method further comprises an act of:
(B) receiving the at least a portion of the volume of storage at the first host computer from a third host computer that exports the at least a portion of the volume of storage to the first host computer so that the at least one second host computer, the third host computer and the first host computer share access to the volume of storage, wherein the at least one second host computer has access to the volume of storage through the first host computer, and wherein the first host computer has access to the volume of storage through the third host computer to create a logical hierarchy of host computers that share access to the volume of storage.

79. The computer readable medium of claim 76, wherein the at least one non-volatile storage device is provided on the first host computer.

80. The computer readable medium of claim 76, wherein the computer system further comprises at least one storage system that includes the non-volatile storage device and makes the volume of storage available to the first host computer.

81. The computer readable medium of claim 76, wherein the method further comprises an act of caching a local copy of the at least a portion of the volume of storage on the first host computer.

82. The computer readable medium of claim 76, wherein the at least one second host computer comprises a plurality of second host computers, and wherein at least one of the plurality of second host computers is untrusted by the first host computer.

83. The computer readable medium of claim 81, wherein the act of caching a local copy of the at least a portion of the volume of storage on the second host computer includes caching the at least a portion of the volume of storage in a set associative cache having two separately indexed portions.

84. The computer readable medium of claim 80, wherein the volume of storage is a logical volume made available from the at least one storage system to the first host computer.

85. The computer readable medium of claim 84, wherein the at least a portion of the volume of storage is a block of the logical volume.

86. The computer readable medium of claim 76, wherein the method further comprises acts of:
storing a local copy of the at least a portion of the volume of storage for the first host computer; and
in response to a write request from one of the plurality of second host computers to write to a first portion of the volume of storage that is included within the at least a portion of the volume of storage stored within the local copy, invalidating the local copy of the first portion of the volume of storage.

87. The computer readable medium of claim 78, wherein the at least one second host computer comprises a plurality of second host computers, wherein each of the plurality of second host computers and the first and third host computers comprises a node in the logical hierarchy, wherein the computer system further includes additional host computers that are not directly coupled to the first host computer and form additional nodes in the logical hierarchy, and wherein the method further comprises an act of:
storing information for first host computer that enables it to participate in the hierarchy, wherein the information is limited to information relating only to the third host computer and the plurality of second host computers that are adjacent to the first host computer in the logical hierarchy.

88. The computer readable medium of claim 76, wherein the method further comprises an act of storing a local copy of the at least a portion of the volume of storage for the first host computer.

89. The computer readable medium of claim 78, wherein the at least one second host computer comprises a plurality of second host computers, wherein each of the plurality of second host computers and the first and third host computers comprises a node in the logical hierarchy, and wherein the method further comprises acts of:
storing a local copy of the volume of storage for the first host computer; and
storing, in association with the local copy, metadata describing the at least a portion of the volume of storage included in the local copy and permissions information defining access authorization for the first host computer to the at least a portion of the volume of storage stored in the local copy.

90. The computer readable medium of claim 89, wherein the method further comprises an act of storing, for the first host computer, permissions information defining access authorization for at least one of the plurality of second host computers which are descendant from the first host computer in the hierarchy.

91. The computer readable medium of claim 89, wherein the method further comprises an act of storing, for the first host computer, permissions information defining access authorization for each of the plurality of second computers which are descendant from the first host computer in the hierarchy.

92. The computer readable medium of claim 89, wherein each of the nodes in the hierarchy has a parent node, wherein the permissions information is granted from a parent node to its descendant nodes in the hierarchy, and wherein the method further comprises acts of:
when the third host computer fails, recovering from the failure by reconnecting the first host computer to the parent node of the third host computer; and
reestablishing the permission information for the first host computer from the parent node of the failed node.

93. A computer readable medium encoded with a program for execution on a computer system including a plurality of host computers and at least one storage system, the plurality of host computers including a first host computer and at least one second host computer, the at least one storage system making a volume of storage available to the first host computer, the at least one storage system having at least storage device on which the volume of storage is stored, the program, when executed, performs a method comprising an act of:
(A) exporting at least a portion of the volume of storage from the first host computer to the at least one second host computer so that the at least one second host computer and the first host computer share access to the volume of storage.

94. The computer readable medium of claim 93, wherein the act (A) includes an act of exporting the at least a portion of the volume of storage to a plurality of second host computers so that the plurality of second host computers and the first host computer share access to the volume of storage.

95. The computer readable medium of claim 93, wherein the method further comprises an act of caching a local copy of the at least a portion of the volume of storage on the first host computer.

96. The computer readable medium of claim 93, wherein the at least one second host computer comprises a plurality of second host computers, and wherein at least one of the plurality of second host computers is untrusted by the first host computer.

97. The computer readable medium of claim 95, wherein the act of caching a local copy of the at least a portion of the volume of storage on the second host computer includes caching the at least a portion of the volume of storage in a set associative cache having at least two separately indexed portions.

98. The computer readable medium of claim 93, wherein the volume of storage is a logical volume made available from the at least one storage system to the first host computer.

99. The computer readable medium of claim 98, wherein the at least a portion of the volume of storage is a block of the logical volume.

100. The computer readable medium of claim 93, wherein the method further comprises acts of:
storing a local copy of the at least a portion of the volume of storage for the first host computer; and
in response to a write request from one of the plurality of second host computers to write to a first portion of the volume of storage that is included within the at least a portion of the volume of storage stored within the local copy, invalidating the local copy of the first portion of the volume of storage.

101. The computer readable medium of claim 93, wherein the at least one second host computer comprises a plurality of second host computers, wherein the plurality of second host computers have access to the volume of storage through the first host computer to create a logical hierarchy of nodes of host computers that share access to the volume of storage, wherein the computer system includes additional host computers that are not directly coupled to the first host computer and form additional nodes in the logical hierarchy, and wherein the method further comprises an act of:
storing information for the first host computer that enables it to participate in the hierarchy, wherein the information is limited to information relating only to the plurality of second host computers that are adjacent to the first host computer in the logical hierarchy.

102. The computer readable medium of claim 93, wherein the method further comprises an act of storing a local copy of the at least a portion of the volume of storage for the first host computer.

103. The computer readable medium of claim 93, wherein the at least one second host computer comprises a plurality of second host computers, wherein the plurality of second host computers have access to the volume of storage through the first host computer to create a logical hierarchy of nodes of host computers that share access to the volume of storage, and wherein the method further comprises acts of:
storing a local copy of the volume of storage for the first host computer; and
storing, in association with the local copy, metadata describing the at least a portion of the volume of storage included in the local copy and permissions information defining access authorization for the first host computer to the at least a portion of the volume of storage stored in the local copy.

104. The computer readable medium of claim 103, wherein the method further comprises an act of storing, for the first host computer, permissions information defining access authorization for at least one of the plurality of second host computers which are descendant from the first host computer in the logical hierarchy.

105. The computer readable medium of claim 103, wherein the method further comprises an act of storing, for the first host computer, permissions information defining access authorization for each of the plurality of second host computers which are descendant from the first host computer in the logical hierarchy.

106. The computer readable medium of claim 103, wherein each of the nodes in the hierarchy has a parent node, wherein the permissions information is granted from a parent node to its descendant nodes in the hierarchy, wherein the computer system includes at least one third host computer that is descendant from one of the plurality of second host computers in the logical hierarchy, and wherein the method further comprises acts of:
when the one of the second host computers fails, recovering from the failure by reconnecting the at least one third host computer to the first host computer which is the parent node of the failed one of the second host computers; and
reestablishing permission information for the third host computer from the first host computer.

107. A computer readable medium encoded with a program for execution on a computer system including a plurality of host computers including a first host computer, at least one second host computer, and a third host computer, the third host computer having a volume of storage available to it, the program, when executed, performs a method comprising acts of:
(A) receiving at least a first portion of the volume of storage at the first host computer from the third host computer which exported the at least a first portion of the volume of storage to the first host computer so that the third host computer and the first host computer share access to the volume of storage; and
(B) exporting at least a second portion of the volume of storage from the first host computer to the at least one second host computer so that the at least one second host computer, the third host computer and the first host computer share access to the volume of storage.

108. The computer readable medium of claim 107, wherein the act (A) includes an act of receiving access for the first host computer to the volume of storage through the third host computer; and
wherein the act (B) includes an act of granting the at least one second host computer access to the volume of storage through the first host computer, whereby the at least one second host computer the third host computer and the first host computer create a logical hierarchy of host computers that share access to the volume of storage.

109. The computer readable medium of claim 107, wherein the act (B) includes an act of exporting the at least a portion of the volume of storage to a plurality of second host computers so that the plurality of second host computers, the first host computer and the third host computer share access to the volume of storage.

110. The computer readable medium of claim 107, wherein the method further comprises an act of caching a local copy of the at least a first portion of the volume of storage on the first host computer.

111. The computer readable medium of claim 107, wherein the at least one second host computer comprises a plurality of second host computers, and wherein at least one of the plurality of second host computers is untrusted by the first host computer.

112. The computer readable medium of claim 110, wherein the act of caching a local copy of the at least a first portion of the volume of storage on the second host computer includes caching the at least a first portion of the volume of storage in a set associative cache having at least two separately indexed portions.

113. The computer readable medium of claim 107, wherein the method further comprises acts of:
 storing a local copy of the at least a first portion of the volume of storage for the first host computer; and
 in response to a write request from one of the plurality of second host computers to write to a specified portion of the volume of storage that is included within the at least a first portion of the volume of storage stored in the local copy, invalidating the local copy of the specified portion of the volume of storage.

114. The computer readable medium of claim 108, wherein the at least one second host computer comprises a plurality of second host computers, wherein each of the plurality of second host computers and the first and third host computers comprises a node in the logical hierarchy, wherein the computer system further includes additional host computers that are not directly coupled to the first host computer and form additional nodes in the logical hierarchy, and wherein the method further comprises an act of:
 storing information for first host computer that enables it to participate in the logical hierarchy, wherein the information is limited to information relating only to the third host computer and the plurality of second host computers that are adjacent to the first host computer in the logical hierarchy.

115. The computer readable medium of claim 107, wherein the method further comprises an act of storing a local copy of the at least a first portion of the volume of storage for the first host computer.

116. The computer readable medium of claim 108, wherein the at least one second host computer comprises a plurality of second host computers, wherein each of the plurality of second host computers and the first and third host computers each comprises a node in the logical hierarchy, and wherein the method further comprises acts of:
 storing a local copy of the at least a first portion of the volume of storage for the first host computer; and
 storing, in association with the local copy, metadata describing the at least a first portion of the volume of storage included in the local copy and permissions information defining access authorization for the first host computer to the at least a first portion of the volume of storage included in the local copy.

117. The computer readable medium of claim 116, wherein the method further comprises an act of storing, for the first host computer, permissions information defining access authorization for at least one of the plurality of second host computers which are descendant from the first host computer in the logical hierarchy.

118. The computer readable medium of claim 116, wherein the method further comprises an act of storing, for the first host computer, permissions information defining access authorization for each of the plurality of second host computers which are descendant from the first host computer in the logical hierarchy.

119. The computer readable medium of claim 116, wherein each of the nodes in the hierarchy has a parent node, wherein the permissions information is granted from a parent node to its descendant nodes in the hierarchy, and wherein the method further comprises acts of:
 when the third host computer fails, recovering from the failure by reconnecting the first host computer to the parent node of the third host computer; and
 reestablishing the permission information for the first host computer from the parent node of the third host computer.

120. The computer readable medium of claim 107, wherein the at least a second portion of the volume of storage is identical to the at least a first portion of the volume of storage.

121. The computer readable medium of claim 107, wherein the at least a second portion of the volume of storage is a subset of the at least a first portion of the volume of storage.

122. A first host computer for use in a computer system including a plurality of host computers including the first host computer and at least one second host computer, the first host computer having a volume of storage available to it that is stored on at least one non-volatile storage device, the first host computer comprising:
 at least one port that enables the first host computer to be coupled to other components in the computer system; and
 at least one controller, coupled to the at least one port, to export at least a portion of the volume of storage from the first host computer to the at least one second host computer so that the at least one second host computer and the first host computer can share access to the volume of storage.

123. The first host computer of claim 122, wherein the at least one controller comprises means for exporting the at least a portion of the volume of storage from the first host computer to the at least one second host computer so that the at least one second host computer and the first host computer can share access to the volume of storage.

124. The first host computer of claim 122, wherein the at least one controller exports the at least a portion of the volume of storage to a plurality of second host computers so that the plurality of second host computers and the first host computer can share access to the volume of storage.

125. The first host computer of claim 122, wherein the at least one controller receives the at least a portion of the volume of storage from a third host computer that exports the at least a portion of the volume of storage to the first host computer so that the third host computer and the first host computer share access to the volume of storage, wherein the at least one controller grants access to the at least a portion of the volume of storage to the at least one second host computer through the first host computer, and wherein the first host computer receives access to the volume of storage through the third host computer, whereby a logical hierarchy of host computers is created that share access to the volume of storage.

126. The first host computer of claim 122, further comprising the at least one non-volatile storage device.

127. The first host computer of claim 122, wherein the computer system further comprises at least one storage system that includes the non-volatile storage device and makes the volume of storage available to the first host computer, and wherein the at least one controller is adapted to receive the volume of storage from the at least one storage system.

128. The first host computer of claim 122, further comprising a cache, and wherein the at least one controller stores a local copy of the at least a portion of the volume of storage in the cache.

129. The first host computer of claim 122, wherein the at least one second host computer comprises a plurality of second host computers, and wherein the at least one controller exports at least a portion of the volume of storage to at least one of the plurality of second host computers that is untrusted by the first host computer.

130. The first host computer of claim 128, wherein the cache is a set associative cache having at least two separately indexed portions.

131. The first host computer of claim 127, wherein the volume of storage is a logical volume made available from the at least one storage system to the first host computer, and wherein the at least one controller is adapted to receive the logical volume from the at least one storage system.

132. The first host computer of claim 122, wherein the at least one controller stores a local copy of the at least a portion of the volume of storage for the first host computer; and wherein in response to a write request from one of the plurality of second host computers to write to a first portion of the volume of storage that is included within the at least a portion of the volume of storage stored within the local copy, the at least one controller invalidates the local copy of the first portion of the volume of storage.

133. The first host computer of claim 125, wherein the at least one second host computer comprises a plurality of second host computers, wherein each of the plurality of second host computers and the first and third host computers comprises a node in the logical hierarchy, wherein the computer system further includes additional host computers that are not directly coupled to the first host computer and form additional nodes in the logical hierarchy, and wherein the at least one controller stores information for first host computer that enables it to participate in the hierarchy, the information being limited to information relating only to the third host computer and the plurality of second host computers that are adjacent to the first host computer in the logical hierarchy.

134. The first host computer of claim 122, wherein the at least one controller stores a local copy of the at least a portion of the volume of storage for the first host computer.

135. The first host computer of claim 125, wherein the at least one second host computer comprises a plurality of second host computers, wherein each of the plurality of second host computers and the first and third host computers each comprises a node in the logical hierarchy, wherein the at least one controller stores a local copy of the volume of storage for the first host computer; and wherein the at least one controller stores, in association with the local copy, metadata describing the at least a portion of the volume of storage included in the local copy and permissions information defining access authorization for the first host computer to the at least a portion of the volume of storage stored in the local copy.

136. The first host computer of claim 135, wherein the at least one controller stores, for the first host computer, permissions information defining access authorization for at least one of the plurality of second host computers which are descendant from the first host computer in the hierarchy.

137. The first host computer of claim 135, wherein the at least one controller stores, for the first host computer, permissions information defining access authorization for each of the plurality of second computers which are descendant from the first host computer in the hierarchy.

138. The first host computer of claim 135, wherein each of the nodes in the hierarchy has a parent node, wherein the permissions information is granted from a parent node to its descendant nodes in the hierarchy, and wherein the at least one controller, when the third host computer fails, recovers from the failure by reconnecting the first host computer to the parent node of the third host computer and reestablishing the permission information for the first host computer from the parent node of the third host computer.

139. A first host computer for use in a computer system including a plurality of host computers and at least one storage system, the plurality of host computers including the first host computer and at least one second host computer, the at least one storage system making a volume of storage available to the first host computer, the at least one storage system having at least storage device on which the volume of storage is stored, the first host computer comprising:

at least one port that enables the first host computer to be coupled to other components in the computer system; and at least one controller, coupled to the at least one port, to export at least a portion of the volume of storage from the first host computer to the at least one second host computer so that the at least one second host computer and the first host computer can share access to the volume of storage.

140. The first host computer of claim 139, wherein the at least one controller comprises means for exporting the at least a portion of the volume of storage from the first host computer to the at least one second host computer so that the at least one second host computer and the first host computer can share access to the volume of storage.

141. The first host computer of claim 139, wherein the at least one controller exports the at least a portion of the volume of storage to a plurality of second host computers so that the plurality of second host computers and the first host computer can share access to the volume of storage.

142. The first host computer of claim 139, further comprising a cache, and wherein the at least one controller stores a local copy of the at least a portion of the volume of storage in the cache.

143. The first host computer of claim 139, wherein the at least one second host computer comprises a plurality of second host computers, and wherein the at least one controller exports at least a portion of the volume of storage to at least one of the plurality of second host computers that is untrusted by the first host computer.

144. The first host computer of claim 142, wherein the cache is a set associative cache having at least two separately indexed portions.

145. The first host computer of claim 139, wherein the volume of storage is a logical volume made available from the at least one storage system to the first host computer, and wherein the at least one controller is adapted to receive the logical volume from the at least one storage system.

146. The first host computer of claim 139, wherein the at least one controller stores a local copy of the at least a portion of the volume of storage for the first host computer; and wherein in response to a write request from one of the plurality of second host computers to write to a first portion of the volume of storage that is included within the at least a portion of the volume of storage stored within the local copy, the at least one controller invalidates the local copy of the first portion of the volume of storage.

147. The first host computer of claim 139, wherein the at least one second host computer comprises a plurality of second host computers, wherein each of the plurality of second host computers and the first host computer each comprises a node in the logical hierarchy, wherein the computer system further includes additional host computers that are not directly coupled to the first host computer and form additional nodes in the logical hierarchy, and wherein the at least one controller stores information for first host computer that enables it to participate in the hierarchy, the information being limited to information relating only to the plurality of second host computers that are adjacent to the first host computer in the logical hierarchy.

148. The first host computer of claim 139, wherein the at least one controller stores a local copy of the at least a portion of the volume of storage for the first host computer.

149. The first host computer of claim 139, wherein the at least one second host computer comprises a plurality of second host computers, wherein each of the plurality of second host computers and the first host computer each comprises a node in the logical hierarchy, wherein the at least one controller stores a local copy of the volume of storage for the first host computer; and
wherein the at least one controller stores, in association with the local copy, metadata describing the at least a portion of the volume of storage included in the local copy and permissions information defining access authorization for the first host computer to the at least a portion of the volume of storage stored in the local copy.

150. The first host computer of claim 149, wherein the at least one controller stores, for the first host computer, permissions information defining access authorization for at least one of the plurality of second host computers which is descendant from the first host computer in the hierarchy.

151. The first host computer of claim 149, wherein the at least one controller stores, for the first host computer, permissions information defining access authorization for each of the plurality of second computers which are descendant from the first host computer in the hierarchy.

152. The first host computer of claim 149, wherein each of the nodes in the logical hierarchy has a parent node, wherein the permissions information is granted from a parent node to its descendant nodes in the hierarchy, wherein the computer system includes at least one third host computer that is descendant from one of the plurality of second host computers in the logical hierarchy, and wherein when the one of the second host computers fails, the at least one controller recovers from the failure by reconnecting the at least one third host computer to the first host computer and reestablishing permission information for the third host computer from the first host computer.

153. A first host computer for use in a computer system including a plurality of host computers including the first host computer, at least one second host computer, and a third host computer, the third host computer having a volume of storage available to it, the first host computer comprising:
at least one port that enables the first host computer to be coupled to other components in the computer system; and
at least one controller, coupled to the at least one port, to receive at least a first portion of the volume of storage from the third host computer which exports the at least a first portion of the volume of storage to the first host computer so that the third host computer and the first host computer can share access to the volume of storage, the at least one controller further adapted to export at least a second portion of the volume of storage from the first host computer to the at least one second host computer so that the at least one second host computer, the third host computer and the first host computer can share access to the volume of storage.

154. The first host computer of claim 153, wherein the at least one controller comprises means for receiving the at least a first portion of the volume of storage from the third host computer and means for exporting the at least a second portion of the volume of storage from the first host computer to the at least one second host computer so that the at least one second host computer, the third host computer and the first host computer can share access to the volume of storage.

155. The first host computer of claim 153, wherein the at least one controller is adapted to receives access to the volume of storage through the third host computer and to grant the at least one second host computer access to the volume of storage through the first host computer, whereby the at least one second host computer the third host computer and the first host computer can form a logical hierarchy of host computers that share access to the volume of storage.

156. The first host computer of claim 153, wherein the at least one controller is adapted to export the at least a portion of the volume of storage to a plurality of second host computers so that the plurality of second host computers, the first host computer and the third host computer can share access to the volume of storage.

157. The first host computer of claim 153, further comprising a cache, and wherein the at least one controller is adapted to store a local copy of the at least a portion of the volume of storage in the cache.

158. The first host computer of claim 153, wherein the at least one second host computer comprises a plurality of second host computers, and wherein the at least one controller is adapted to export at least a portion of the volume of storage to at least one of the plurality of second host computers that is untrusted by the first host computer.

159. The first host computer of claim 157, wherein the cache is a set associative cache having at least two separately indexed portions.

160. The first host computer of claim 153, wherein the volume of storage is a logical volume made available from the at least one storage system to the first host computer, and wherein the at least one controller is adapted to receive the logical volume from the at least one storage system.

161. The first host computer of claim 153, wherein the at least one controller is adapted to store a local copy of the at least a portion of the volume of storage for the first host computer; and
wherein in response to a write request from one of the plurality of second host computers to write to a first portion of the volume of storage that is included within the at least a portion of the volume of storage stored within the local copy, the at least one controller is adapted to invalidate the local copy of the first portion of the volume of storage.

162. The first host computer of claim 153, wherein the at least one second host computer comprises a plurality of second host computers, wherein each of the plurality of second host computers and the first and third host computers each comprises a node in the logical hierarchy, wherein the computer system further includes additional host computers that are not directly coupled to the first host computer and form additional nodes in the logical hierarchy, and wherein the at least one controller stores information for first host computer that enables it to participate in the hierarchy, the information being limited to information relating only to the third host computer and the plurality of second host computers that are adjacent to the first host computer in the logical hierarchy.

163. The first host computer of claim 153, wherein the at least one controller is adapted to store a local copy of the at least a portion of the volume of storage for the first host computer.

164. The first host computer of claim 153, wherein the at least one second host computer comprises a plurality of second host computers, wherein each of the plurality of second host computers and the first and third host computers each comprises a node in the logical hierarchy, wherein the at least one controller is adapted to store a local copy of the volume of storage for the first host computer; and wherein the at least one controller is adapted to store, in association with the local copy, metadata describing the at least a portion of the volume of storage included in the local copy and permissions information defining access authorization for the first host computer to the at least a portion of the volume of storage stored in the local copy.

165. The first host computer of claim 164, wherein the at least one controller is adapted to store, for the first host computer, permissions information defining access authorization for at least one of the plurality of second host computers which are descendant from the first host computer in the hierarchy.

166. The first host computer of claim 164, wherein the at least one controller is adapted to store, for the first host computer, permissions information defining access authorization for each of the plurality of second computers which are descendant from the first host computer in the hierarchy.

167. The first host computer of claim 164, wherein each of the nodes in the hierarchy has a parent node, wherein the permissions information is granted from a parent node to its descendant nodes in the hierarchy, and wherein the at least one controller, when the third host computer fails, is adapted to recover from the failure by reconnecting the first host computer to the parent node of the third host computer and reestablishing the permission information for the first host computer from the parent node of the third host computer.

168. The first host computer of claim 153, wherein the at least a second portion of the volume of storage is identical to the at least a first portion of the volume of storage.

169. The first host computer of claim 153, wherein the at least a second portion of the volume of storage is a subset of the at least a first portion of the volume of storage.

* * * * *